(12) United States Patent
Kato et al.

(10) Patent No.: US 7,564,576 B2
(45) Date of Patent: Jul. 21, 2009

(54) PRINTING SYSTEM AND ITS CONTROL METHOD, PRINTER AND ITS CONTROL METHOD, AND IMAGE SENSING APPARATUS AND ITS CONTROL METHOD

(75) Inventors: Masao Kato, Kanagawa (JP); Akitoshi Yamada, Kanagawa (JP); Fumitaka Goto, Tokyo (JP); Tetsuya Kawanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 885 days.

(21) Appl. No.: 10/773,328

(22) Filed: Feb. 9, 2004

(65) Prior Publication Data
US 2004/0160632 A1 Aug. 19, 2004

(30) Foreign Application Priority Data
Feb. 18, 2003 (JP) .............................. 2003-039712
Jan. 26, 2004 (JP) .............................. 2004-017371

(51) Int. Cl.
*G06F 15/00* (2006.01)
(52) U.S. Cl. ...................... 358/1.15; 358/1.9; 358/1.13; 358/435; 348/207.2
(58) Field of Classification Search ....... 358/1.13–1.16, 358/1.9, 435, 439; 348/207.2
See application file for complete search history.

(56) References Cited

U.S. PATENT DOCUMENTS

| | | | |
|---|---|---|---|
| 5,589,946 A | 12/1996 | Shimokoriyama et al. | 386/47 |
| 5,682,203 A | 10/1997 | Kato | 348/340 |
| 6,563,542 B1 * | 5/2003 | Hatakenaka et al. | 348/333.02 |
| 6,628,830 B1 | 9/2003 | Yamazoe et al. | 382/168 |
| 7,024,500 B2 * | 4/2006 | Ashizaki et al. | 710/65 |
| 2001/0013894 A1 | 8/2001 | Parulski et al. | 348/207 |
| 2001/0030692 A1 * | 10/2001 | Yoneda | 348/207 |
| 2001/0048534 A1 * | 12/2001 | Tanaka et al. | 358/1.16 |
| 2002/0029277 A1 * | 3/2002 | Simpson-Young et al. | 709/228 |
| 2002/0054350 A1 * | 5/2002 | Kakigi et al. | 358/1.16 |
| 2003/0067620 A1 | 4/2003 | Matsumoto et al. | 358/1.13 |

(Continued)

FOREIGN PATENT DOCUMENTS

JP 2000-13625 1/2000

(Continued)

*Primary Examiner*—Chan S Park
(74) *Attorney, Agent, or Firm*—Fitzpatrick, Cella, Harper & Scinto

(57) ABSTRACT

This invention has as its object to receive image data from image sensing apparatuses of various manufacturers and to print a high-quality image by making image data transfer and a printing instruction, which are independent from interfaces. Since an image sensing apparatus such as a digital camera or the like calculates image feature amounts, and transfers the calculation result to a printing apparatus, huge image data need not be transferred from the image sensing apparatus to the printing apparatus again and again, and a high-quality image can be output. Upon printing image data transmitted from a digital camera (DSC) (3012) to a PD printer (1000), after a protocol is established by applications (NCDP) installed in the PD printer and DSC, the PD printer transmits its Capability list to the DSC. The DSC calculates an image feature amount of a selected image to be printed, and transmits the calculation result to the PD printer. Upon reception of this information, the PD printer makes image correction based on that image feature amount, and records (prints) an image.

39 Claims, 32 Drawing Sheets

U.S. PATENT DOCUMENTS

| | | | |
|---|---|---|---|
| 2003/0084085 A1* | 5/2003 | Breidenbach et al. | 709/1 |
| 2003/0156196 A1 | 8/2003 | Kato et al. | 348/207.2 |
| 2004/0201727 A1* | 10/2004 | Ichikawa et al. | 348/223.1 |
| 2006/0044395 A1* | 3/2006 | Aichi et al. | 348/207.2 |

FOREIGN PATENT DOCUMENTS

| | | |
|---|---|---|
| KR | 2002-71739 | 9/2002 |

* cited by examiner

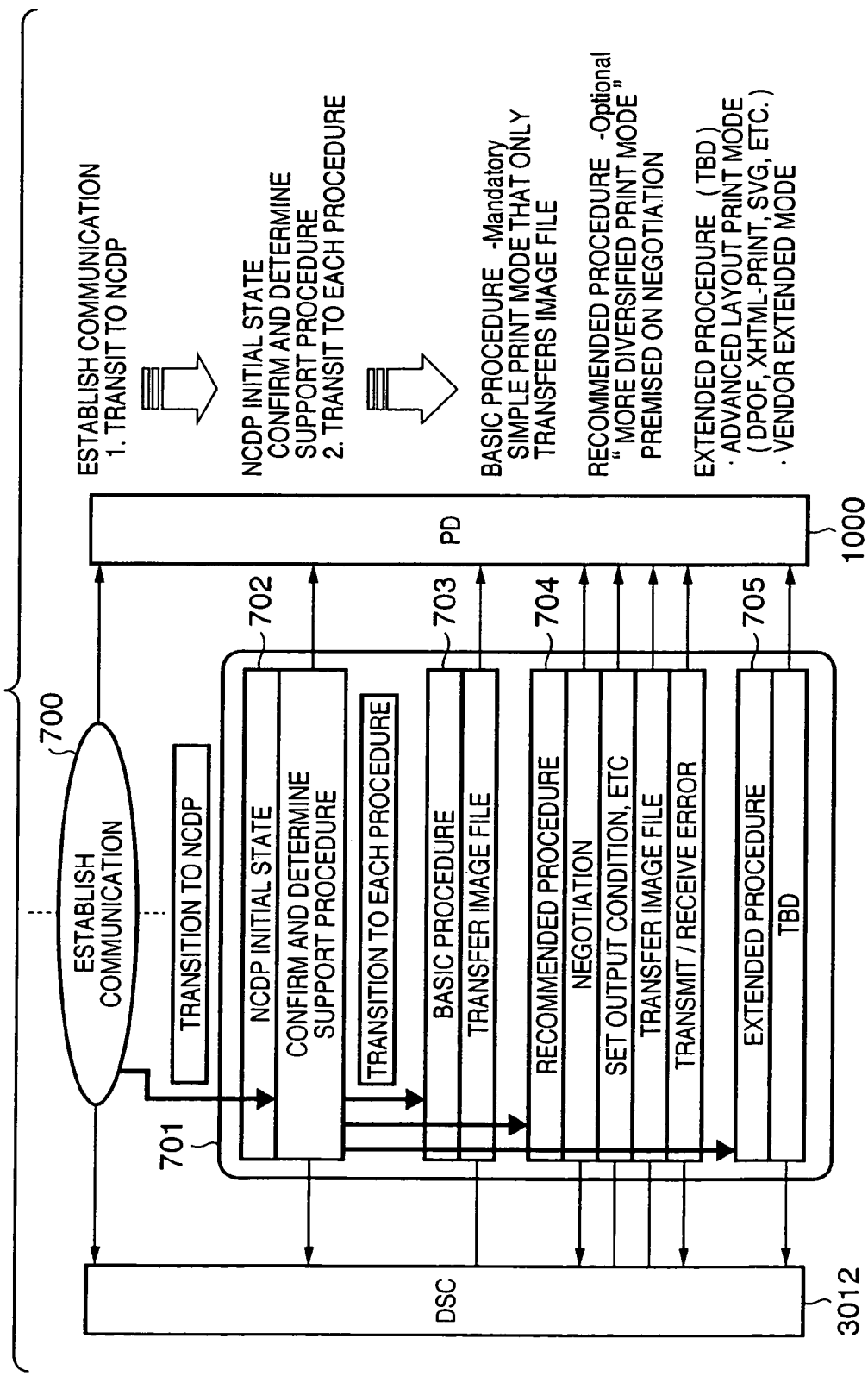

FIG. 8

| SOURCE | FUNCTION NAME | COMPATIBLE MODE | | | FUNCTION |
|---|---|---|---|---|---|
| | | BASIC | RECOMMENDED | EXTENDED | |
| PRINTER | NCDPStart | ○ | ○ | ○ | TRANSITION TO NCDP |
| | ProcedureStart | ○ | ○ | ○ | TRANSITION TO EACH MODE (BASIC, RECOMMENDED, EXTENDED) |
| | NCDPEnd | ○ | ○ | ○ | TERMINATE FROM NCDP |
| | Capability | | ○ | | NOTIFY PRINTER FUNCTION (IF NEGOTIATION IS REQUIRED) |
| | GetImage | ○ | ○ | | ACQUIRE IMAGE (JPEG, ETC.) FROM DSC |
| | StatusSend | | ○ | | NOTIFY ERROR STATUS |
| | PageStart | | ○ | | NOTIFY PRINT START (UPON FEEDING SHEET FOR EACH PAGE) |
| | PageEnd | | ○ | | NOTIFY PRINT END (UPON DISCHARGING SHEET FOR EACH PAGE) |
| | JobEnd | | ○ | | NOTIFY END OF PRINT JOB |
| DSC | JobStart | ○ | ○ | | PRINT COMMAND |
| | JobAbort | | ○ | | PRINT ABORT COMMAND |
| | JobContinue | | ○ | | PRINT RESTART COMMAND |

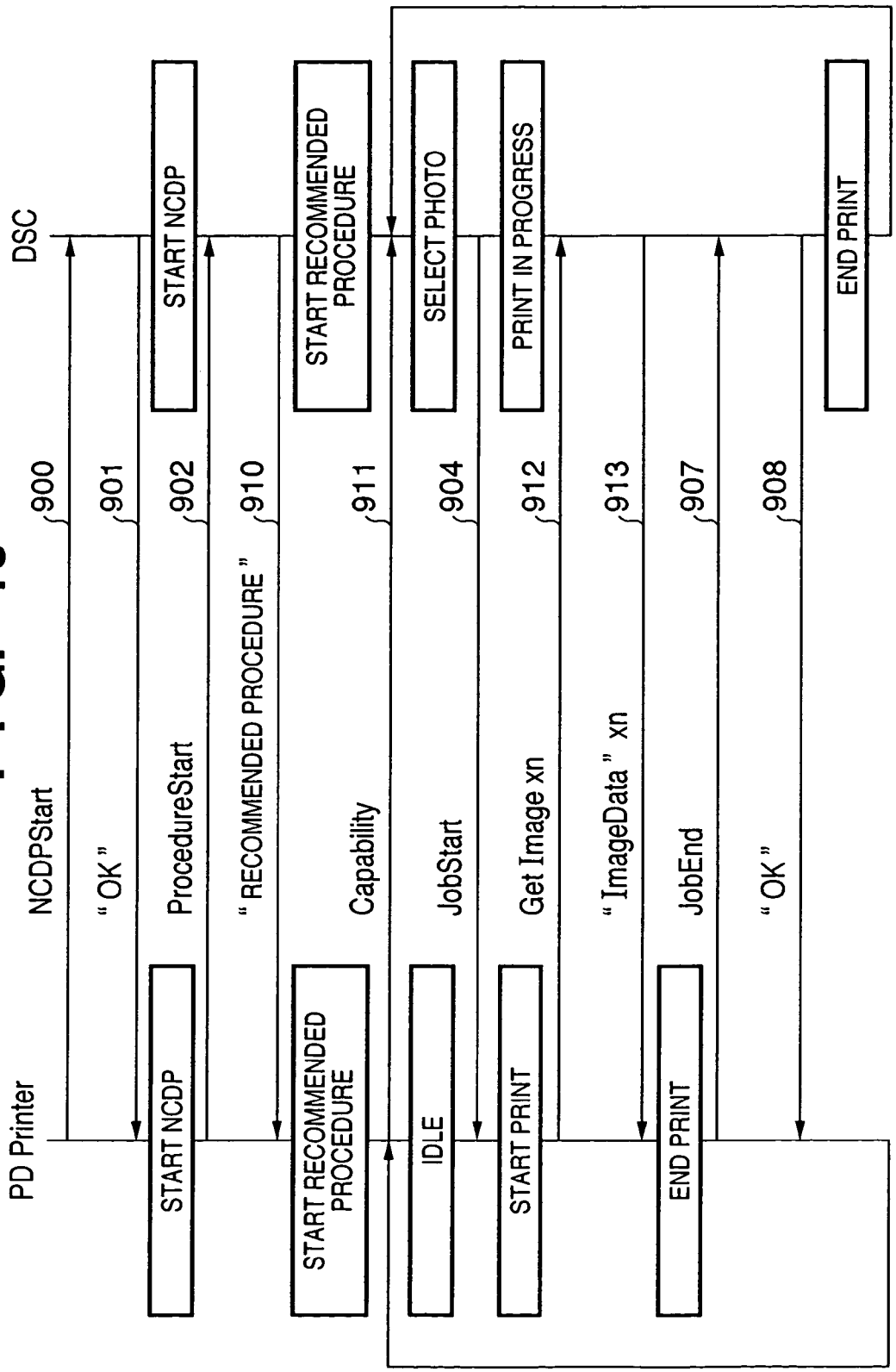

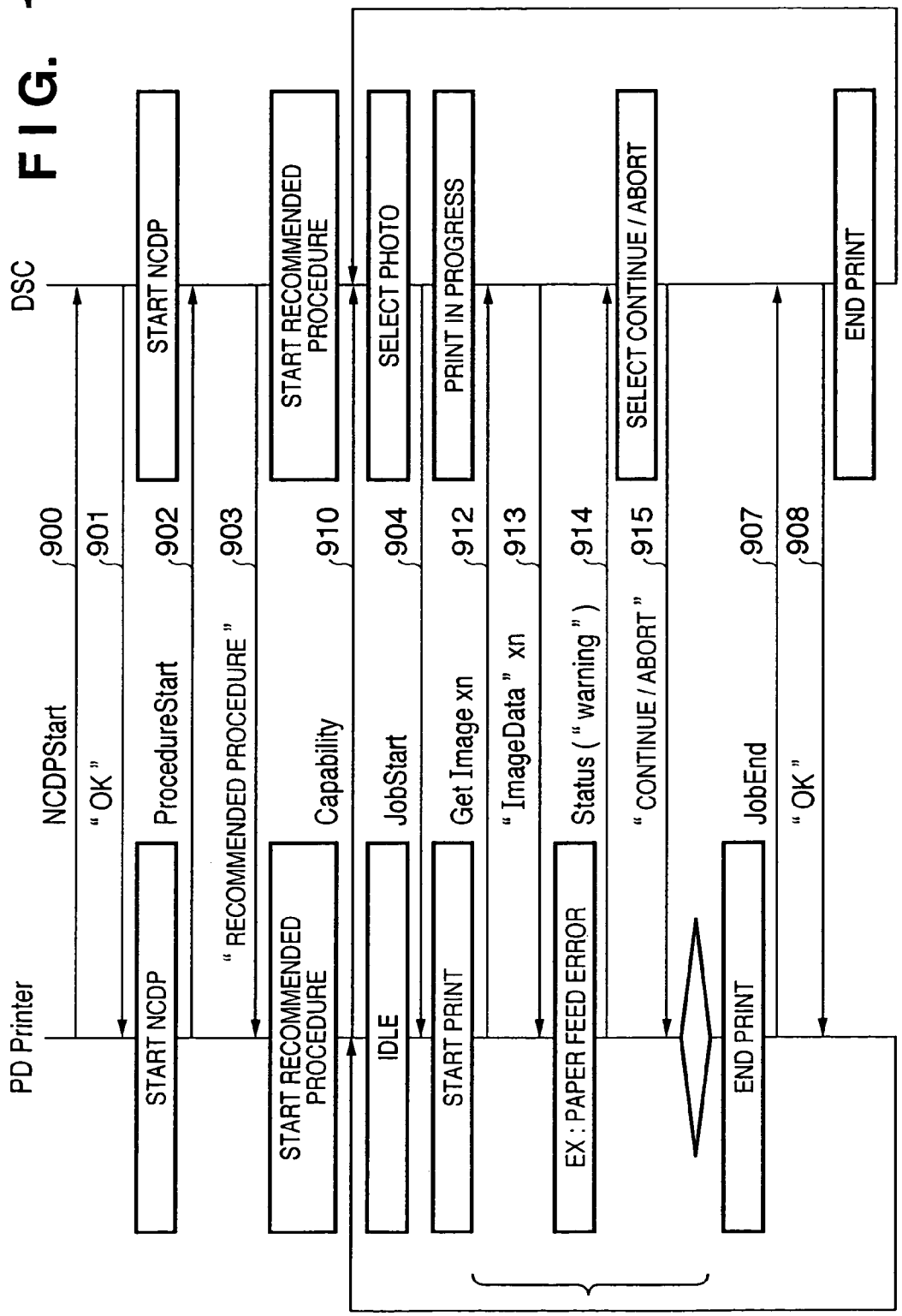

FIG. 12

```
<CAPABILITY>
ITEMS THAT DO NOT REQUIRE NEGOTIATION                    DESCRIBE CONTENTS OF CAPABILITY
  <Quality=Draft, Normal, Fine>                          • OUTPUT QUALITY (QUICK, NORMAL, FINE)
  <PaperSize=L, 2L,Card,Wallet, 4×6, A4, Letter, ...>    • DESCRIBE PAPER SIZE
  <PaperType=Plain, Photo>                               • PAPER TYPE (NORMAL PAPER, PHOTO DEDICATED PAPER)
ITEMS THAT REQUIRE NEGOTIATION
  <ImageType=Tiff, Jpeg, BMP, ...>                       • DESCRIBE SUPPORTED IMAGE FORMAT INFORMATION
  <Date=On, Off>                                         • DATE OUTPUT (On, Off)
  <FileName = On, Off>                                   • FILE NAME OUTPUT (On, Off)
  <Layout=PAPER SIZE / LAYOUT1, ..., INDEX(N×M)>         • DESCRIBE OUTPUTTABLE LAYOUT
  <Layout=L / Borderless,1×1, 1×2, 2×2, INDEX(3×5)>        CORRESPONDING TO PAPER SIZE
  <Layout=2L / Borderless,1×1, 1×2, 2×2, INDEX(5×7)>
  <Layout=Card / Borderless,1×1, 1×2, INDEX(2×3)>
  ...
  <Layout=Letter / Borderless,1×1, 1×2, 2×2, 2×4, 4×4, INDEX(8×10)>
  <ImageOptimize=On, Off>                                • IMAGE CORRECTION (On, Off)
  <SizePerPicture=3MByte>                                • OUTPUTTABLE IMAGE SIZE
  <Option>                                               • DESCRIPTION OF OPTION
    <Vender=Ganon, HP, SQNY, ...>                        • VENDOR NAME
    <ImageOptimize=DiPS, Auto, On, APP, Vivid, Off, ...> • VENDOR UNIQUE SPECIFICATION (IMAGE CORRECTION)
    <Trimming=(X, Y, W, H)>                              • VENDOR UNIQUE SPECIFICATION (TRIMMING)
  </Option>
  ...
  <Option>
</CAPABILITY>
```

FIG. 27

```
< ?xml version = "1.0"? >
 < input >
  < startJob >
   < jobConfig >
    < imageOptimize > 81FF0108 < /imageOptimize >
   < /jobConfig >
   < printInfo >
    < fileID > 0001 < /fileID >
   < /printInfo >
   < histogramInfo >
    < fileID > H0001 < /fileID >
   < /histogramInfo >
  < /startJob >
 < /input >
< / dps >
```

FIG. 28

```
< ?xml version = "1.0"? >
 < input >
  < startJob >
   < jobConfig >
    < imageOptimize > 81FF0108 < /imageOptimize >
   < /jobConfig >
   < printInfo >
    < fileID > 0001 < /fileID >
   < /printInfo >
   < histogramInfo >
    < histogramData >
        0100000050806............
    < /histogramData >
   < /histogramInfo >
  < /startJob >
 < /input >
< / dps >
```

PRINTING SYSTEM AND ITS CONTROL METHOD, PRINTER AND ITS CONTROL METHOD, AND IMAGE SENSING APPARATUS AND ITS CONTROL METHOD

FIELD OF THE INVENTION

The present invention relates to a printing system which has an image sensing apparatus such as a digital camera or the like, and a printing apparatus, its print control method, and a photo-direct printing apparatus.

BACKGROUND OF THE INVENTION

In recent years, so-called digital cameras (image sensing apparatuses) which can sense an image and can convert the sensed image into digital image data by a simple operation have been popularly used. When an image sensed by such camera is printed and is used as a photo, it is a common practice to temporarily input the sensed digital image data from the digital camera to a PC (personal computer), to apply an image process to that digital image data in that PC, and to output the digital image data from the PC to a color printer, which prints out that image.

By contrast, in recent years, a color print system which can directly transmit digital image data to a color printer to print it out without the intervention of any PC, a so-called photo-direct (PD) printer which can directly receive a memory card that is mounted on a digital camera and stores sensed images, and can print sensed images stored in that memory card, and the like have been developed.

On the other hand, many techniques for improving the image quality upon outputting images sensed by a digital camera have been disclosed. For example, as described in Japanese Patent Laid-Open No. 2000-13625, a scheme for correcting any white balance deviation, contrast drop, and the like, which have occurred upon sensing an image by a digital camera, and improving the image quality upon outputting that image is known. This technique extracts the histograms of density, saturation, hue, lightness, and the like of an image, which characterize the image, as individual image feature amounts, and corrects the image to output it more sharply. With this technique, an image with higher image quality can be easily output.

Specifically, when image data is directly transmitted from a digital camera to a printer and is printed out, digital cameras have different specifications, operation methods, and the like depending on manufacturers, the advent of a photo-direct printer apparatus which is compatible to digital cameras of various manufacturers is demanded.

Such photo-direct printer which is compatible to digital cameras for respective manufacturers cannot often interpret function information supplied from an arbitrary digital camera, i.e., often receives a print instruction using a function other than those of the printer apparatus. For example, the size or type of paper sheets designated by a digital camera may often be different from that of paper sheets which are actually set on a printer. In such a case, formation of a print image may be disturbed.

SUMMARY OF THE INVENTION

The present invention has been made in consideration of the above prior arts, and has as its object to provide a printing system which can receive and print image data from image sensing apparatuses of various manufacturers by making image data transfer and a printing instruction, which do not depend on any interfaces, a print control method of that system, and a photo-direct print apparatus.

It is another object of the present invention to provide a printing system which can prevent deterioration of a print image due to a print condition mismatch by printing an image under the condition of a given printing apparatus when a print condition designated by an image sensing apparatus is different from the actual one of the printing apparatus, a print control method of that system, and a photo-direct print apparatus.

When image correction is made in a photo-direct printer, the following problems are further posed. Upon making the aforementioned image correction, an analysis process of an entire image must be executed prior to a print process, so as to acquire that image. For this purpose, a digital camera compresses a sensed image by JPEG, and saves that compressed image. Hence, the photo-direct printer which receives such compressed image data temporarily decodes entire JPEG data, extracts required feature amounts from respective pixel data, and generates parameters for a correction process. In an actual print process, the printer decodes the JPEG data again, and generates print data by correcting the decoded image data in accordance with the previously generated parameters. That is, the printer requires decoding twice.

This results in an increase in cost since the photo-direct printer apparatus must include a memory size large enough to hold the temporarily decoded data. Furthermore, image feature amounts must be calculated from all pixel data of the entire image. Such image process requires a long processing time, and the total print speed often lowers. Especially, in a photo-direct printer which has considerably limited CPU and memory resources, such phenomenon occurs conspicuously.

When a photo-direct printer does not have a memory size which is not large enough to receive JPEG data transmitted from a digital camera, the digital camera must transfer image data to such photo-direct printers in batches a plurality of number of times. That is, in order to perform the aforementioned image correction in such situation, image data must be exchanged again and again between the printer and digital camera so as to output an image. For this reason, compared to an output process by a normal PC, not only the system configuration is complicated so as to manage/control which part of image data has been transferred, but also a longer print process time is required since the transfer time increases accordingly, resulting in poor usability. Furthermore, the image data size increases year by year with increasing number of pixels of recent digital cameras. Hence, such problem becomes more serious.

The present invention has been made to solve the aforementioned problems, and has as its object to attain quicker and easier image correction in a photo-direct print process from a digital camera.

According to the present invention, the foregoing object is attained by providing a printing system in which an image sensing apparatus and printing apparatus directly communicate with each other, and the printing apparatus prints image data transmitted from the image sensing apparatus, wherein the printing apparatus comprises: first transmission means for transmitting function information of the printing apparatus from the printing apparatus to the image sensing apparatus after a protocol is established by applications installed in the printing apparatus and the image sensing apparatus; first reception means for receiving image data and information associated with a feature amount of the image from the image sensing apparatus; and correction means for correcting the image data received by the first reception means on the basis of the feature amount, and the image sensing apparatus comprises: second reception means for receiving the function information from the printing apparatus; feature amount extraction means for extracting a feature amount of a sensed image; and second transmission means for transmitting information associated with the feature amount extracted by the feature amount extraction means to the printing apparatus on the basis of the function information received by the second reception means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view for explaining an outline of NCDP communication procedures according to the embodiment of the present invention;

FIG. 8 is a view for explaining commands in NCDP according to the embodiment of the present invention;

FIG. 10 is a chart for explaining a print sequence based on "recommended procedure" in NCDP according to the embodiment of the present invention;

FIG. 11 is a chart for explaining a print sequence upon occurrence of an error in "recommended procedure" in NCDP according to the embodiment of the present invention;

FIG. 12 is a view for explaining an example of Capability transmitted in NCDP according to the embodiment of the present invention;

FIG. 27 shows an example of a print job file according to the embodiment of the present invention;

FIG. 28 shows another example of a print job file according to the embodiment of the present invention;

DETAILED DESCRIPTION OF THE PREFERRED EMBODIMENTS

Preferred embodiments of the present invention will now be described in detail in accordance with the accompanying drawings.

Figure 1:
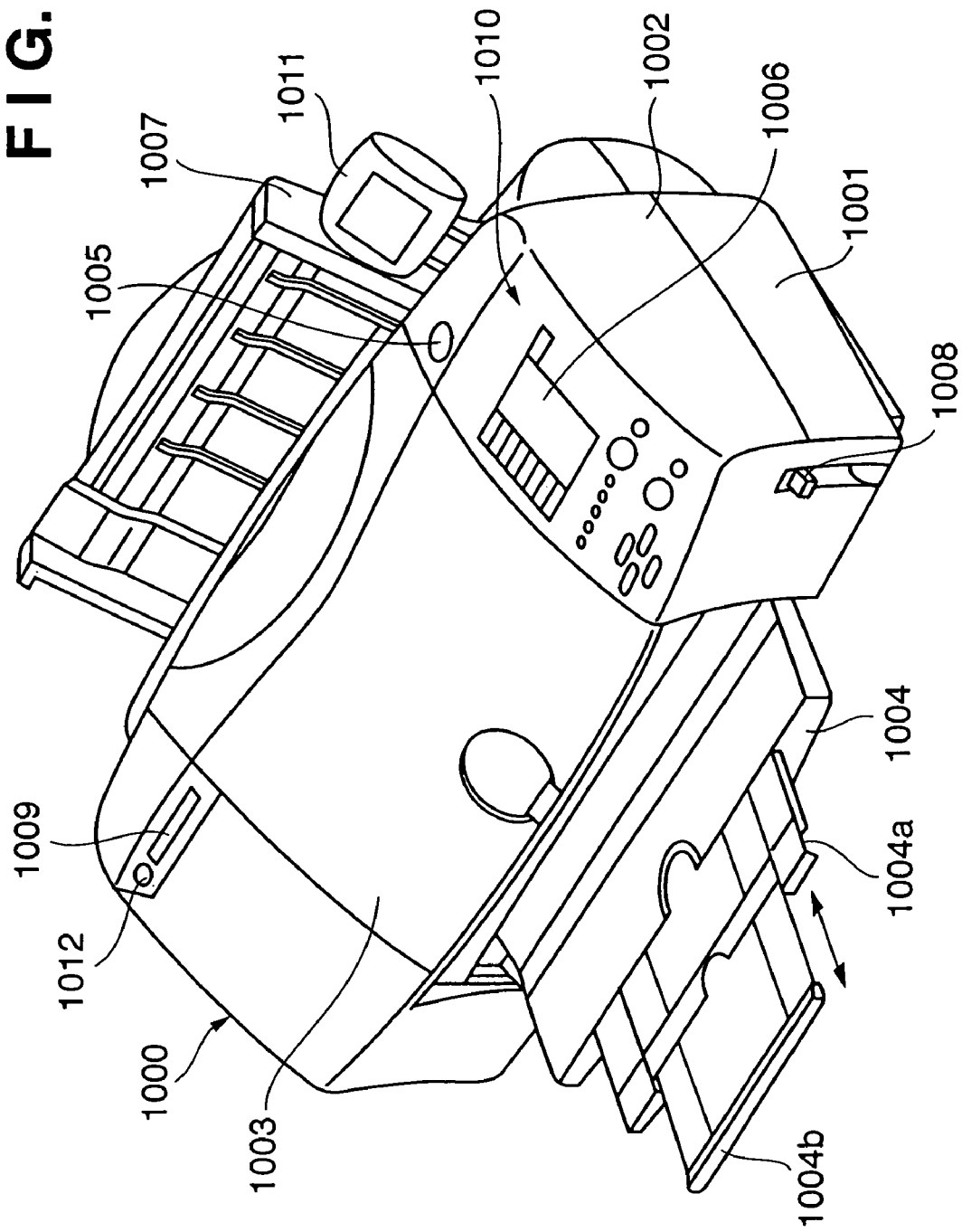
FIG. 1 is a schematic perspective view of a PD printer according to an embodiment of the present invention.

FIG. 1 is a schematic perspective view of a photo direct printer apparatus (to be referred to as a PD printer hereinafter) 1000 according to an embodiment of the present invention. This PD printer 1000 has a function of printing data received from a host computer (PC) as a normal PC printer, a function of printing image data directly read from a storage medium such as a memory card or the like, and a function of printing image data directly received from a digital camera.

Referring to FIG. 1, a main body which forms a housing of the PD printer 1000 according to this embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. For this reason, upon making the printer execute a print process, the exhaust tray 1004 is rotated toward the front surface side to open the opening, so that print sheets can be exhausted from the opening. The exhausted print sheets are stacked on the exhaust tray 1004 in turn. The exhaust tray 1004 stores two auxiliary trays 1004a and 1004b. When these auxiliary trays are pulled out as needed, the loading area of print sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover 1003 is detected.

A power key 1005 is arranged on the upper surface of the upper case 1002 so that the user can press it. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically feeds a print sheet into the apparatus main body. Reference numeral 1008 denotes a paper gap select lever which is used to adjust the gap between the printhead and print sheet. Reference numeral 1009 denotes a card slot which receives an adapter that can receive a memory card. Via this adapter, image data stored in the memory card can be directly fetched and printed. As this memory card (PC card), for example, a compact flash® memory card, smart media card, memory stick, and the like are available. Reference numeral 1011 denotes a viewer (liquid crystal display unit) which is detachable from the main body of this PD printer 1000, and is used to display an image for one frame, index images, and the like, when the user wants to search images stored in the PC card for an image to be printed. Reference numeral 1012 denotes a USB terminal used to connect a digital camera (to be described later). Also, another USB connector used to connect a personal computer (PC) is provided on the rear surface of this PD printer 1000.

Figure 2:
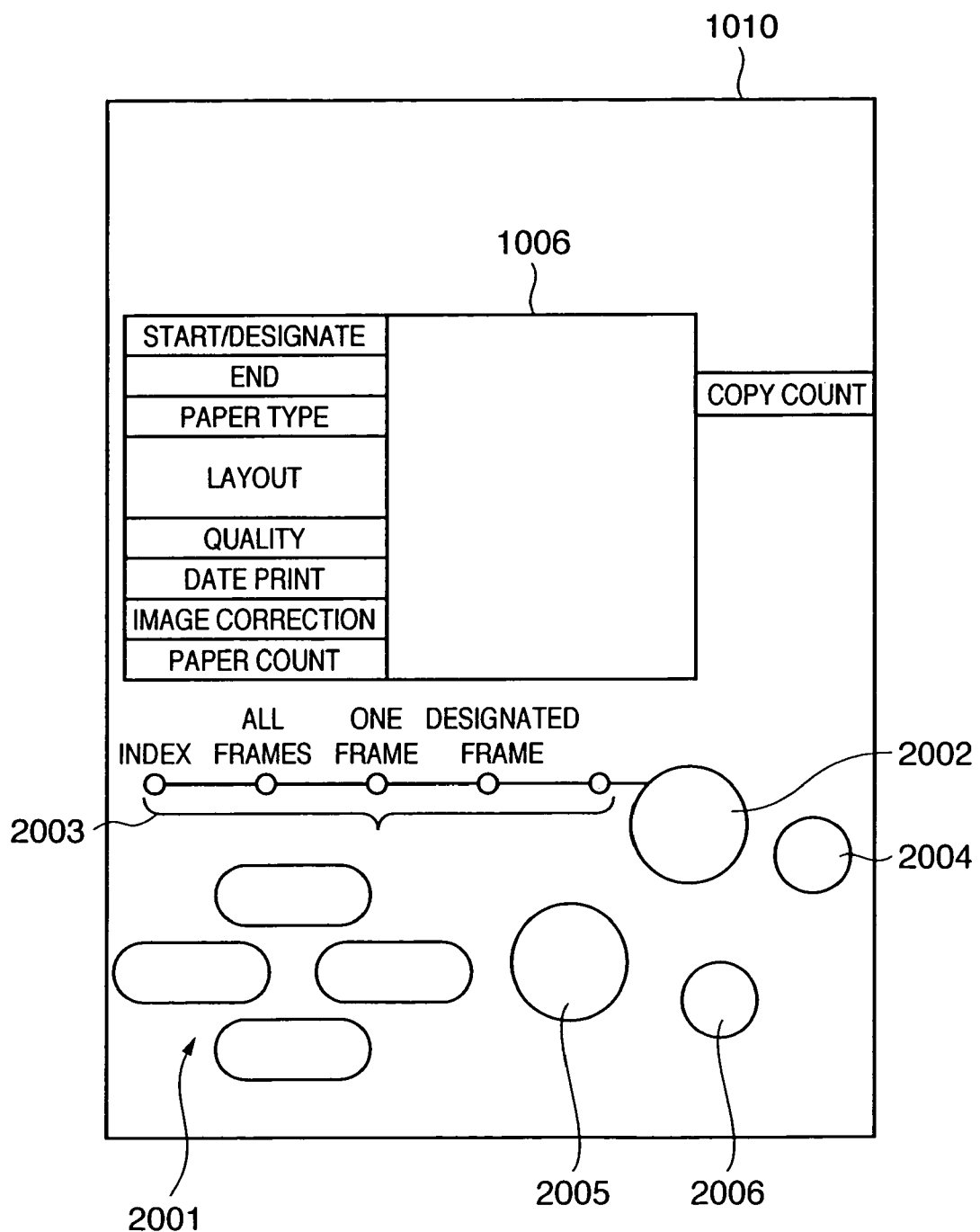
FIG. 2 is a schematic view of a control panel of the PD printer according to the embodiment of the present invention.

FIG. 2 is a schematic view of the control panel 1010 of the PD printer 1000 according to this embodiment.

Referring to FIG. 2, the liquid crystal display unit 1006 displays menu items used to set data associated with item names printed on the right and left sides of the unit 1006. The items printed here include, e.g., the first photo number or designated frame number of the range to be printed (start frame designation/print frame designation), the last photo number of the range to be printed (end), the number of copies to be printed (copy count), the type of paper sheet (print sheet) used in a print process (paper type), the setup of the number of photos to be printed per print sheet (layout), designation of print quality (quality), designation as to whether or not to print a photographing date (date print), designation as to whether or not to print a photo after correction (image correction), display of the number of print sheets required for the print process (print sheet count), and the like. These items are selected or designated using cursor keys 2001. Reference numeral 2002 denotes a mode key. Every time this key is pressed, a print mode (index print, all-frame print, one-frame print, and the like) can be switched, and a corresponding one of LEDs 2003 is turned on in accordance with the selected print mode. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance is canceled.

The arrangement of principal part associated with the control of the PD printer 1000 according to this embodiment will be described below with reference to FIG. 3. Note that the same reference numerals in FIG. 3 denote parts common to those in the above drawings, and a description thereof will be omitted.

Figure 3:
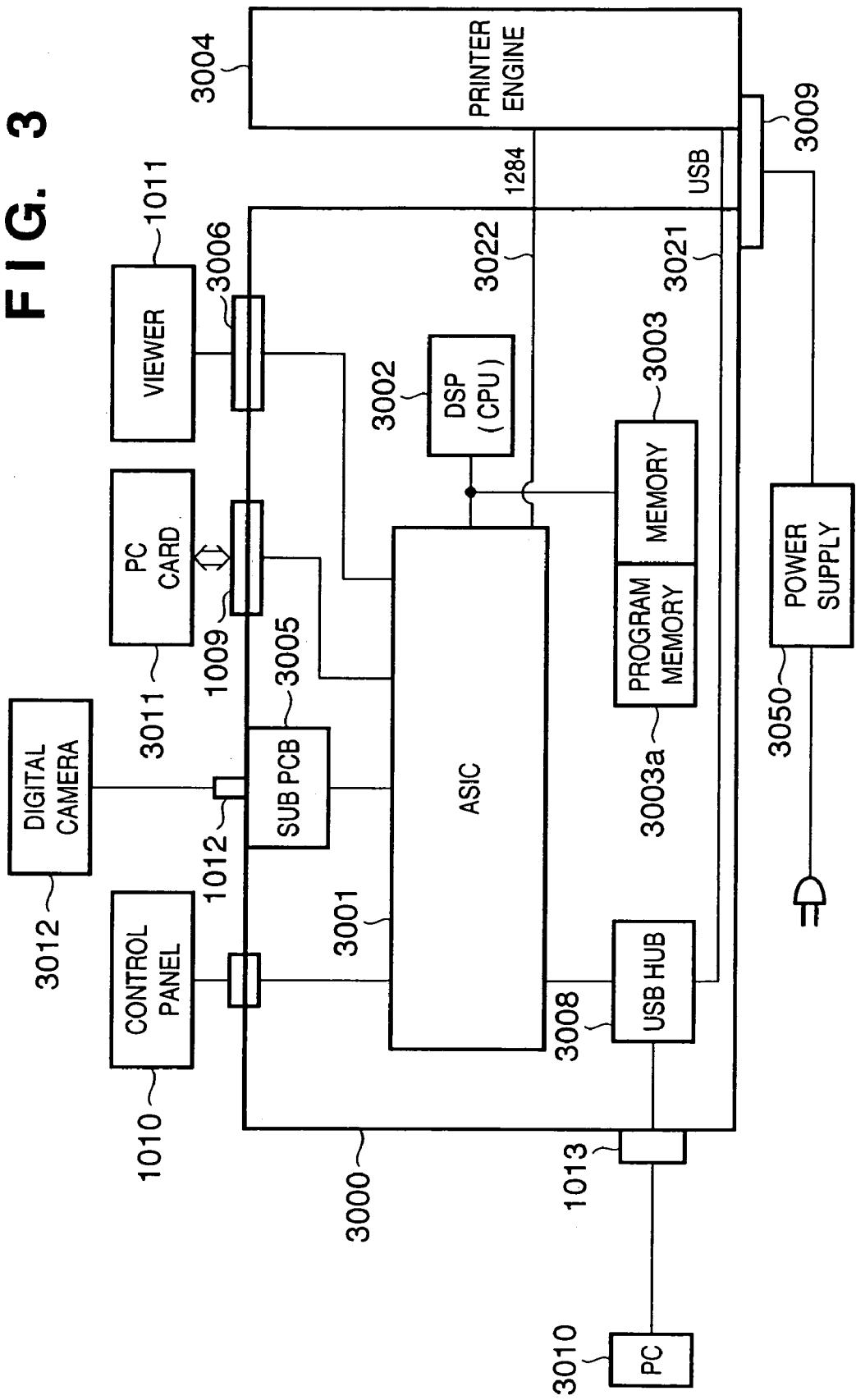
FIG. 3 is a block diagram showing the arrangement of principal part associated with control of the PD printer according to the embodiment of the present invention.

Referring to FIG. 3, reference numeral 3000 denotes a controller (control board). Reference numeral 3001 denotes an ASIC (dedicated custom LSI). The arrangement of the ASIC 3001 will be described later with reference to the block diagram of FIG. 4. Reference numeral 3002 denotes a DSP (digital signal processor), which includes a CPU and executes various control processes to be described later, and image processes such as conversion from a luminance signal (RGB) into a density signal (CMYK), scaling, gamma conversion, error diffusion, and the like. Reference numeral 3003 denotes a memory, which has a memory area that serves as a program memory 3003a for storing a control program to be executed by the CPU of the DSP 3002, a RAM area for storing a running program, and a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011. Reference numeral 3008 denotes a USB hub (USB HUB). When the PD printer 1000 executes a print process based on image data from a PC 3010, the USB hub 3008 allows data received from the PC 3010 to pass through it, and outputs the data to the printer engine 3004 via a USB 3021. In this way, the PC 3010 connected to the printer can execute a print process by directly exchanging data, signals, and the like with the printer engine 3004 (the printer serves as a normal PC printer). Reference numeral 3009 denotes a power supply connector, which inputs a DC voltage which is converted from commercial AC power by a power supply 3050. The PC 3010 is a general personal computer. Reference numeral 3011 denotes a memory card (PC card) mentioned above; and 3012, a digital camera (to be also referred to as a DSC: Digital Still Camera). Note that the DSP 3002 also has a function for generating function information of the printer and transmitting the generated information to the DSC, and a function of executing a correction process of image data on the basis of data associated with image feature amounts. A program that implements such functions is also recorded on the program memory 3003a.

Note that signals are exchanged between this controller 3000 and printer engine 3004 via the aforementioned USB 3021 or an IEEE1284 bus 3022.

Figure 4:
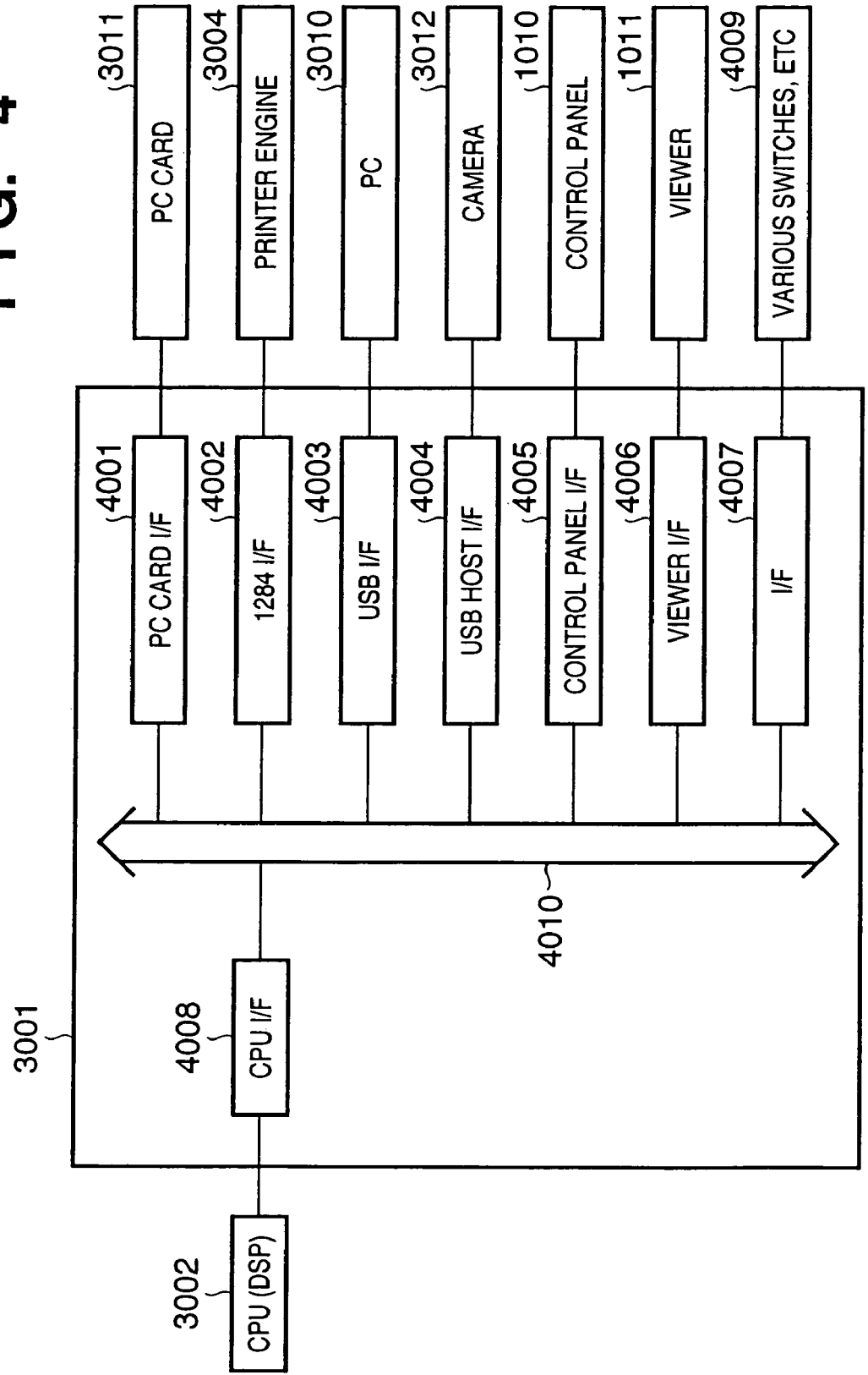
FIG. 4 is a block diagram showing the arrangement of an ASIC of the PD printer according to the embodiment of the present invention.

FIG. 4 is a block diagram showing the arrangement of the ASIC 3001. In FIG. 4 as well, the same reference numerals denote parts common to those in the above drawings, and a description thereof will be omitted.

Reference numeral 4001 denotes a PC card interface, which is used to read image data stored in the inserted PC card 3011, to write data in the PC card 3011, and so forth. Reference numeral 4002 denotes an IEEE1284 interface, which is used to exchange data with the printer engine 3004. This IEEE1284 interface 4002 is a bus used when image data stored in the digital camera 3012 or PC card 3011 is to be printed. Reference numeral 4003 denotes a USB interface, which exchanges data with the PC 3010. Reference numeral 4004 denotes a USB host interface, which exchanges data with the digital camera 3012. Reference numeral 4005 denotes a control panel interface, which receives various operation signals from the control panel 1010, and outputs display data to the display unit 1006. Reference numeral 4006 denotes a viewer interface, which controls display of image data on the viewer 1011. Reference numeral 4007 denotes an interface, which controls interfaces with various switches, LEDs 4009, and the like. Reference numeral 4008 denotes a CPU interface, which exchanges data with the DSP 3002. Reference numeral 4010 denotes an internal bus (ASIC bus), which interconnects these interfaces.

An overview of the operations based on the above arrangement will be described hereinafter.

<Normal PC Printer Mode>

This mode is a print mode for printing an image on the basis of print data sent from the PC 3010.

In this mode, when data is input from the PC 3010 via the USB connector 1013 (FIG. 3), it is directly sent to the printer engine 3004 via the USB hub 3008 and USB 3021, and a print process is executed based on the data from the PC 3010.

<Direct Print Mode from PC Card>

When the PC card 3011 is attached to or detached from the card slot 1009, an interrupt is generated, and the DSP 3002 can detect based on this interrupt whether or not the PC card 3011 is attached or detached (removed). When the PC card 3011 is attached, compressed image data (e.g., compressed by JPEG) stored in that PC card 3011 is read and stored in the memory 3003. When the user has issued a print instruction of that stored image data using the control panel 1010, the compressed image data is decompressed and stored in the memory 3003, and is then converted into print data that can be printed by the printer engine 3004 by executing conversion from RGB signals into YMCK signals, gamma correction, error diffusion, and the like. The print data is output to the printer engine 3004 via the IEEE1284 interface 4002, thus printing an image.

<Direct Print Mode from Camera>

Figure 5:
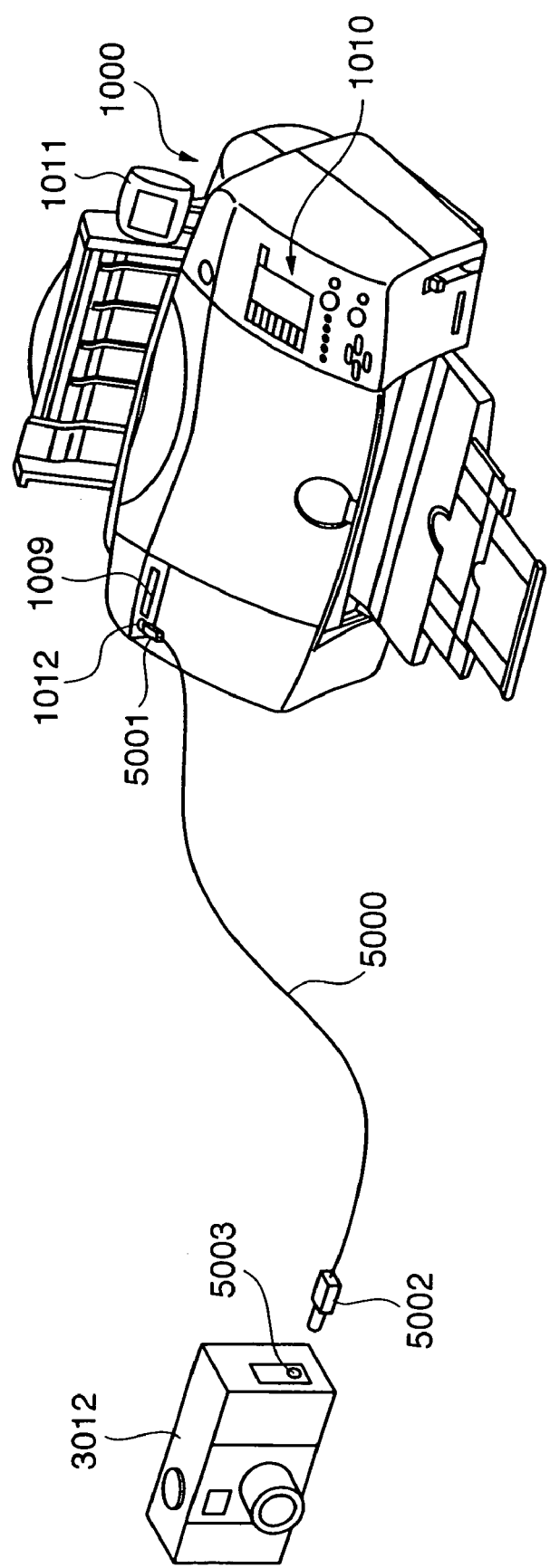
FIG. 5 is a view showing the connection state of the PD printer and a digital camera according to the embodiment of the present invention.

FIG. 5 shows the connection state of the PD printer 1000 and digital camera (DSC) 3012 according to this embodiment.

Referring to FIG. 5, a cable 5000 comprises a connector 5001 which is connected to the connector 1012 of the PD printer 1000, and a connector 5002 which is connected to a connector 5003 of the digital camera 3012. The digital camera 3012 can output image data saved in its internal memory via the connector 5003. Note that the digital camera 3012 can adopt various arrangements, e.g., an arrangement that comprises an internal memory as storage means, an arrangement that comprises a slot for receiving a detachable memory card, and so forth. When the PD printer 1000 and digital camera 3012 are connected via the cable 5000 shown in FIG. 5, image data output from the digital camera 3012 can be directly printed by the PD printer 1000.

When the digital camera 3012 is connected to the PD printer 1000, as shown in FIG. 5, a camera mark alone is displayed on the display unit 1006 on the control panel 1010, display and operations on the control panel 1010 are disabled, and display on the viewer 1011 is also disabled. Therefore, since only key operations at the digital camera 3012 and image display on a display unit (not shown) of the digital camera 3012 are enabled, the user can make print designation using that digital camera 3012.

This embodiment has as its object to provide a PD printer that can connect digital cameras of a plurality of manufacturers, and can print their image data, and protocols required upon making a print process by connecting the PD printer 1000 according to this embodiment and digital camera will be described in detail hereinafter.

This embodiment proposes NCDP (New Camera Direct Print) which makes communication control between the PD printer and digital camera using a versatile file and versatile format, and is independent from interfaces.

Figure 6:
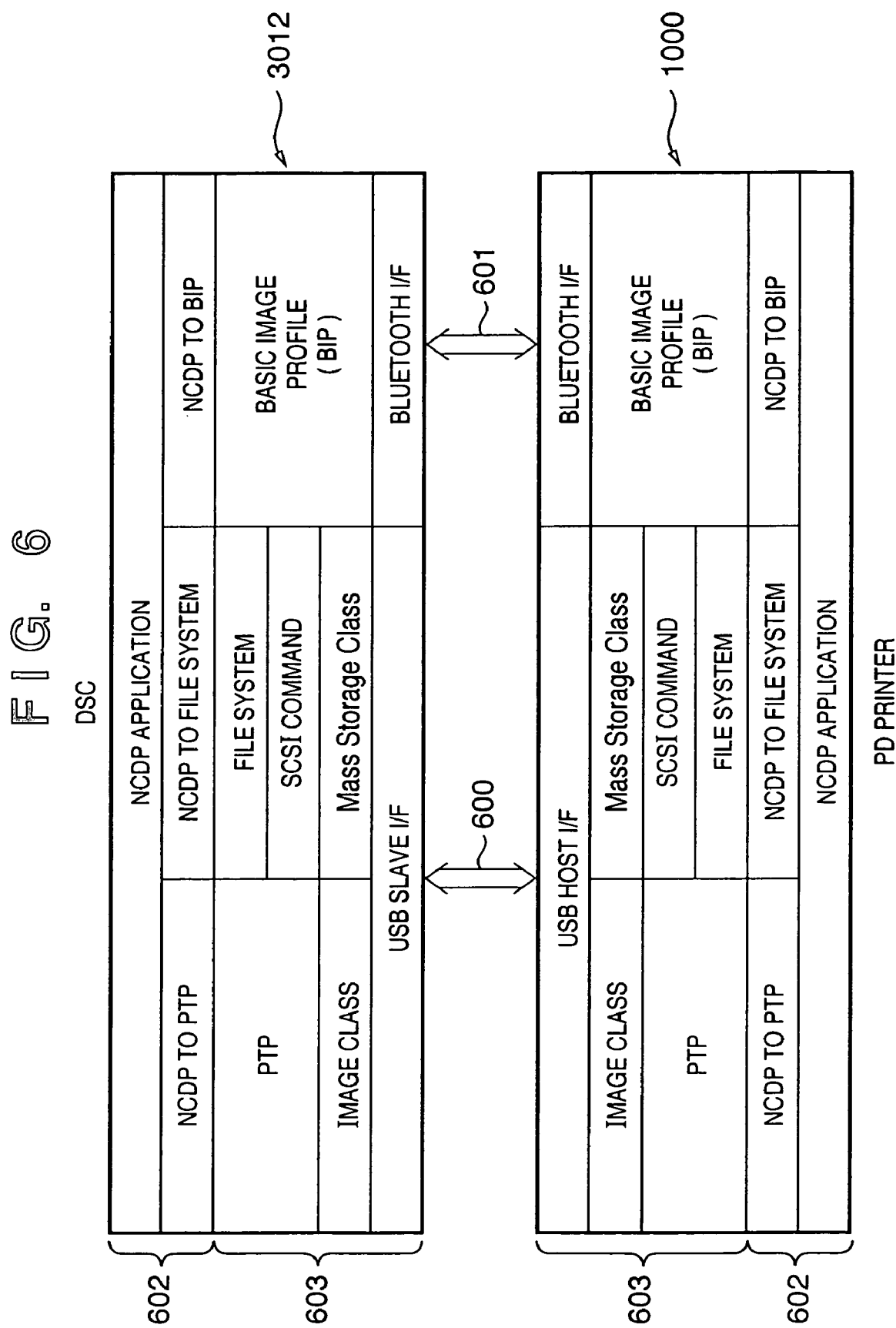
FIG. 6 is a view for explaining the software configurations of the PD printer and digital camera, which incorporate NCDP according to the embodiment of the present invention.

FIG. 6 shows an example of the configuration of this NCDP.

Referring to FIG. 6, reference numeral 600 denotes a USB interface; and 601, a Bluetooth interface. Reference numeral 602 denotes an application layer which is built in upon forming a system based on NCDP. Reference numeral 603 denotes a layer that implements existing protocols and interfaces. In FIG. 6, PTP (Picture Transfer Protocol), SCSI, BIP (Basic Image Profile) of Bluetooth, and the like are installed. The NCDP according to this embodiment is premised on installation as an application on the architecture of the above protocol layer. In this case, the PD printer 1000 is specified as a USB host, the digital camera 3012 is specified as a USB device; they have the same NCDP configurations, as shown in FIG. 6.

FIG. 7 is a view for explaining the flow of communication procedures between the PD printer 1000 and digital camera (DSC) 3012 on the basis of the NCDP according to this embodiment.

In this case, when the PD printer 1000 and DSC 3012 detect that they are connected via the USB cable 5000, as shown in FIG. 5, a communication between these devices is allowed. As a result, applications installed in these devices are executed to start transition to procedures 701 based on the NCDP. Reference numeral 702 denotes an initial state of the NCDP. In this state, it is determined whether or not each other's models can implement the NCDP. If the NCDP can be implemented, the devices make transition to the procedures 701. If the DSC 3012 does not install any NCDP, no communication control based on the NCDP is executed. After transition to the NCDP is made in this way, when the DSC 3012 issues a transfer/print instruction of image data based on "basic procedure", as shown in procedure 703, the control shifts to a simple print mode in which an image file is transferred from the DSC 3012 to the PD printer 1000, and is printed. On the other hand, when the DSC 3012 issues a transfer/print instruction of image data based on "recommended procedure", as shown in procedure 704, the control shifts to a print mode corresponding to diversified functions, in which the DSC 3012 and PD printer 1000 make various negotiations to determine the print condition and the like, an image file is transferred from the DSC 3012 to the PD printer 1000, and the transferred image file is printed. Furthermore, when the DSC 3012 issues a transfer/print instruction of image data based on "extended procedure", as shown in procedure 705, a mode that executes a print process using an advanced layout function such as DPOF, XHTML-print, SVG, or the like and specifications unique to each vendor is set. Note that the detailed specifications based on this "extended procedure" are specified in the specifications of each individual DSC manufacturer, and a description thereof will be omitted. Note that the image print processes based on these "basic procedure" and "recommended procedure" will be described later with reference to FIGS. 9 to 11.

FIG. 8 is a view for explaining commands to execute a print process in the NCDP according to this embodiment.

Referring to FIG. 8, "compatible mode" corresponds to the above "basic procedure", "recommended procedure", and "extended procedure" designated by the DSC 3012. In "recommended procedure", all commands can be used. However, since "basic procedure" is a simple print mode, only NCDP start and end commands, a shift command to each of "basic procedure", "recommended procedure", and "extended procedure" modes, an acquisition command of image data from the camera 3012, and a print command from the camera 3012 can be used. In "extended procedure", only NCDP start and end commands, and a shift command to each of "basic procedure", "recommended procedure", and "extended procedure" modes are allowed to be used in FIG. 8. However, as described above, other commands may be used in accordance with the specifications of respective manufacturers.

The image print processes based on the above "basic procedure" and "extended procedure" will be explained below.

Figure 9:
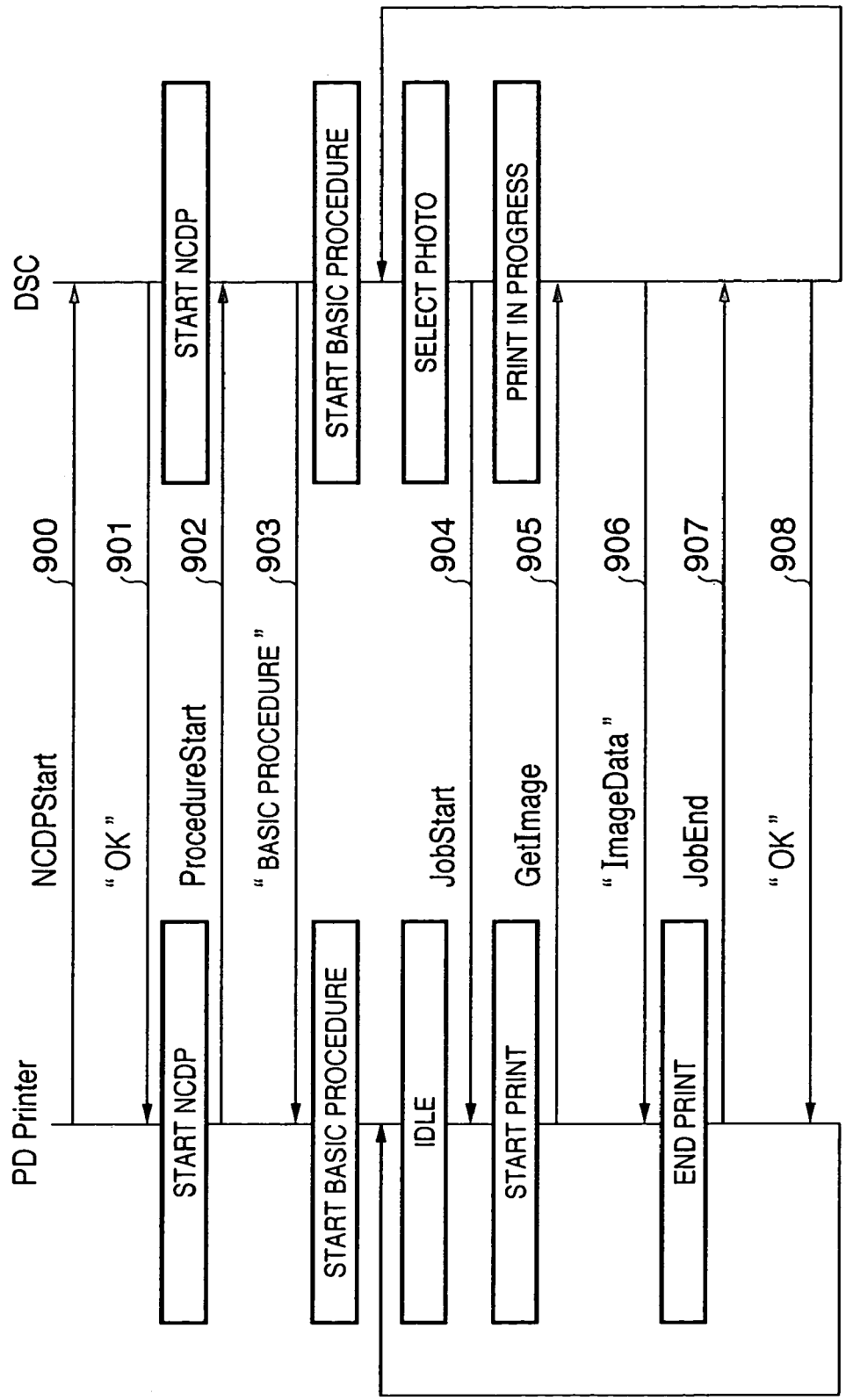
FIG. 9 is a chart for explaining a print sequence based on "basic procedure" in NCDP according to the embodiment of the present invention.

FIG. 9 is a chart for explaining the NCDP communication procedures when an image print process is executed based on "basic procedure". This "basic procedure" is a simple print mode in which one image file is transferred from the DSC 3012 to the PD printer 1000 and is printed. Compatible image formats include, e.g., an RGB image of the VGA size (640×480 pixels) and a JPEG image of the VGA size (640×480 pixels). Also, the image file size is about 1 Mbytes or less. The DSC 3012 transmits an image file in an image format supported by the PD printer 1000. In this case, no error handling is executed.

The PD printer 1000 sends a command (NCDPStart) indicating transition to NCDP to the DSC 3012 at timing 900. If the DSC 3012 installs NCDP, it replies "OK" (timing 901). Note that a practical example of this NCDP confirmation procedure using PTP will be explained in detail later with reference to FIG. 14.

If the PD printer 1000 and DSC 3012 confirm each other that the NCDP is installed, the PD printer 1000 transmits a mode start command (ProcedureStart) to the DSC 3012 (timing 902). In response to this command, when the DSC 3012 transmits "basic procedure" as a simple print mode at timing 903, the control shifts to a print mode based on "basic procedure". In this case, when an image to be printed is selected and its print instruction is issued upon operation on the DSC 3012, a command (JobStart) indicating the start of a print job is sent from the DSC 3012 to the PD printer 1000 (timing 904). In response to this command, the PD printer 1000 is set in the simple print mode, and sends a command (GetImage) to the DSC 3012 to request it to send a JPEG image (timing 905). Then, the DSC 3012 sends a JPEG image to the PD printer 1000 (timing 906), and a print process in the PD printer 1000 starts. Upon completion of the print process of the designated image, the PD printer 1000 sends a command (JobEnd) indicating the end of the print job to the DSC 3012 (timing 907). When the DSC 3012 returns an affirmative response (OK) in response to this command (timing 908), the print process based on this "basic procedure" ends. Note that whether or not commands are to be exchanged in this "basic procedure" is also determined by Capability information in both the DSC and PD printer.

FIG. 10 is a chart for explaining the NCDP communication procedures when an image print process is executed based on "recommended procedure". The same reference numerals in FIG. 10 denote procedures common to those in FIG. 9, and a description thereof will be omitted. In this "recommended procedure", a "more diversified print" mode premised on negotiation between the PD printer 1000 and DSC 3012 can be set, and photo print and layout print processes of a plurality of images can be made. Also, error handling can be executed.

In FIG. 10, after the PD printer 1000 and DSC 3012 confirm each other as in FIG. 9 that the NCDP is installed, the DSC 3012 designates "recommended procedure" (timing 910) in this case. After that, procedures based on this "recommended procedure" are executed. The PD printer 1000 informs the DSC 3012 of all functions including its own functions, paper setups, and the like as Capability information, as indicated by timing 911. This Capability information is transmitted to the DSC 3012 in a script format (text).

FIG. 12 shows an example of this Capability information.

As shown in FIG. 12, this Capability information contains information of the printable paper types and sizes, print quality, image data format, ON/OFF of date print, ON/OFF of file name print, layout, and ON/OFF of image correction, and also information of ON/OFF of functions corresponding to the specification of each camera manufacturer and the like as options.

In this way, use of the Capability information that adopts script notation allows easy export to the architecture of another communication protocol, and easy standardization of exchange of such function information. Note that this script notation may comply with XML.

The user of the DSC 3012 that received such Capability information determines which of the functions of the PD printer 1000 is to be used in the current print process, selects an image to be printed, and selects and determines the print condition of that image from the functions of the PD printer 1000. After the user determines the image to be printed, its print condition, and the like, and issues a print start instruction, the DSC 3012 sends a print command (JobStart) to the PD printer 1000. In response to this command, the PD printer 1000 issues a command (GetImage xn) which requests that image data (timing 912). In response to this command, the DSC 3012 transmits corresponding image data in an image format (Tiff, JPEG, RGB, or the like) that the PD printer 1000 can receive (timing 913). The reason why a plurality of image data can be transmitted for an image print process per paper sheet is that when, for example, a 2×2 layout print mode or the like is designated, four image data must be transmitted per paper sheet. Upon completion of the print process of the designated image, the PD printer 1000 transmits a command (JobEnd) indicating the end of the print job to the DSC 3012 (timing 907). When the DSC 3012 returns an affirmative response (OK) in response to this command (timing 908), the control starts the select and print processes of the next image based on this "recommended procedure" again.

FIG. 11 is a chart for explaining the communication procedures when an error has occurred in the PD printer 1000 in the NCDP communication procedures upon executing an image print process based on the above "recommended procedure". The same reference numerals in FIG. 11 denote procedures common to those in FIG. 10, and a description thereof will be omitted.

FIG. 11 exemplifies a case wherein a paper feed error has occurred in the PD printer 1000 during the print process based on "recommended procedure". In this case, the PD printer 1000 sends status information (Status) indicating the paper feed error to the DSC 3012 at timing 914. In response to this information, a command indicating if that print process is to be continued (JobContinue) or aborted (JobAbort) is transmitted to the PD printer 1000 on the basis of designation contents determined by the user of the DSC 3012 (timing 915). When the print process is to be aborted, the PD printer 1000 aborts that print process, and transmits a print job end message (JobEnd). On the other hand, when continuation of the print process is designated, the apparatus continues the print process after that paper feed error is recovered.

The aforementioned processing sequence will be explained below with reference to the flow chart of FIG. 13.

Figure 13:
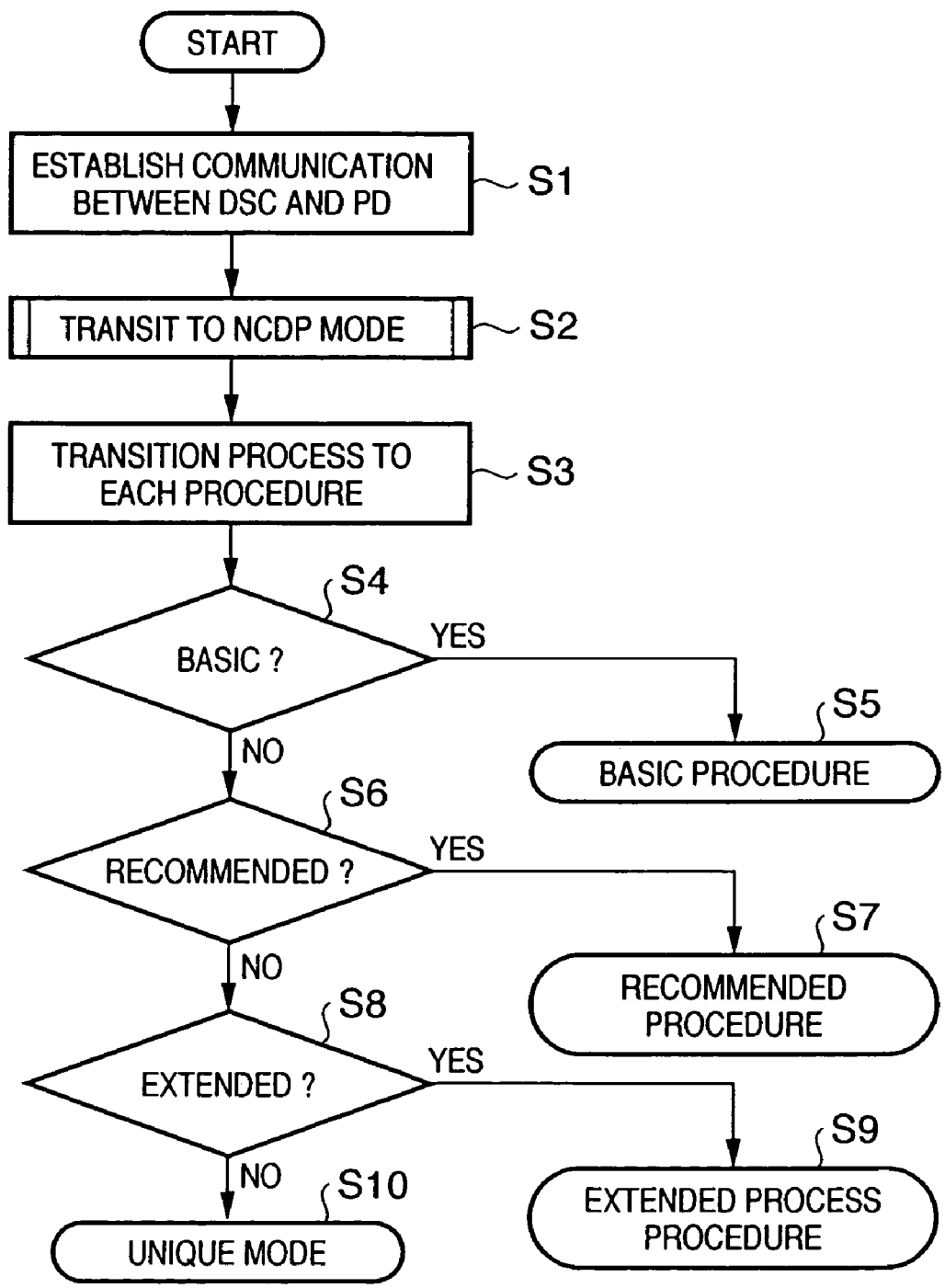
FIG. 13 is a flow chart for explaining an outline of the NCDP communication procedures according to the embodiment of the present invention.

FIG. 13 is a flow chart for explaining the processing sequence shown in FIG. 7.

In step S1, a communication is established between the digital camera (DSC) 3012 and PD printer 1000 (timing 700). It is checked in step S2 if these devices have already installed NCDP. If these devices have already installed NCDP, the NCDP mode starts. The flow then advances to step S3 to receive a procedure instruction from the DSC 3012, and to start the designated procedure. If "basic procedure" is designated, the flow advances from step S4 to step S5 to execute a print process based on "basic procedure". On the other hand, if "recommended procedure" is designated, the flow advances from step S6 to step S7 to execute a print process based on "recommended procedure". Furthermore, if "extended procedure" is designated, the flow advances from step S8 to step S9 to execute a print process based on "extended procedure" corresponding to each vendor. If another procedure is designated, the flow advances to step S10 to execute a print process in a mode unique to the PD printer 1000 and DSC 3012.

Examples wherein various commands (FIG. 8) in the NCDP mode mentioned above are implemented using the versatile PTP (wrapper using PTP) will be described. In this embodiment, NCDP using PTP will be exemplified. However, the present invention is not limited to such specific examples. For example, a direct print service API may be implemented on another interface or another class (Class).

[NCDPStart]

Figure 14:
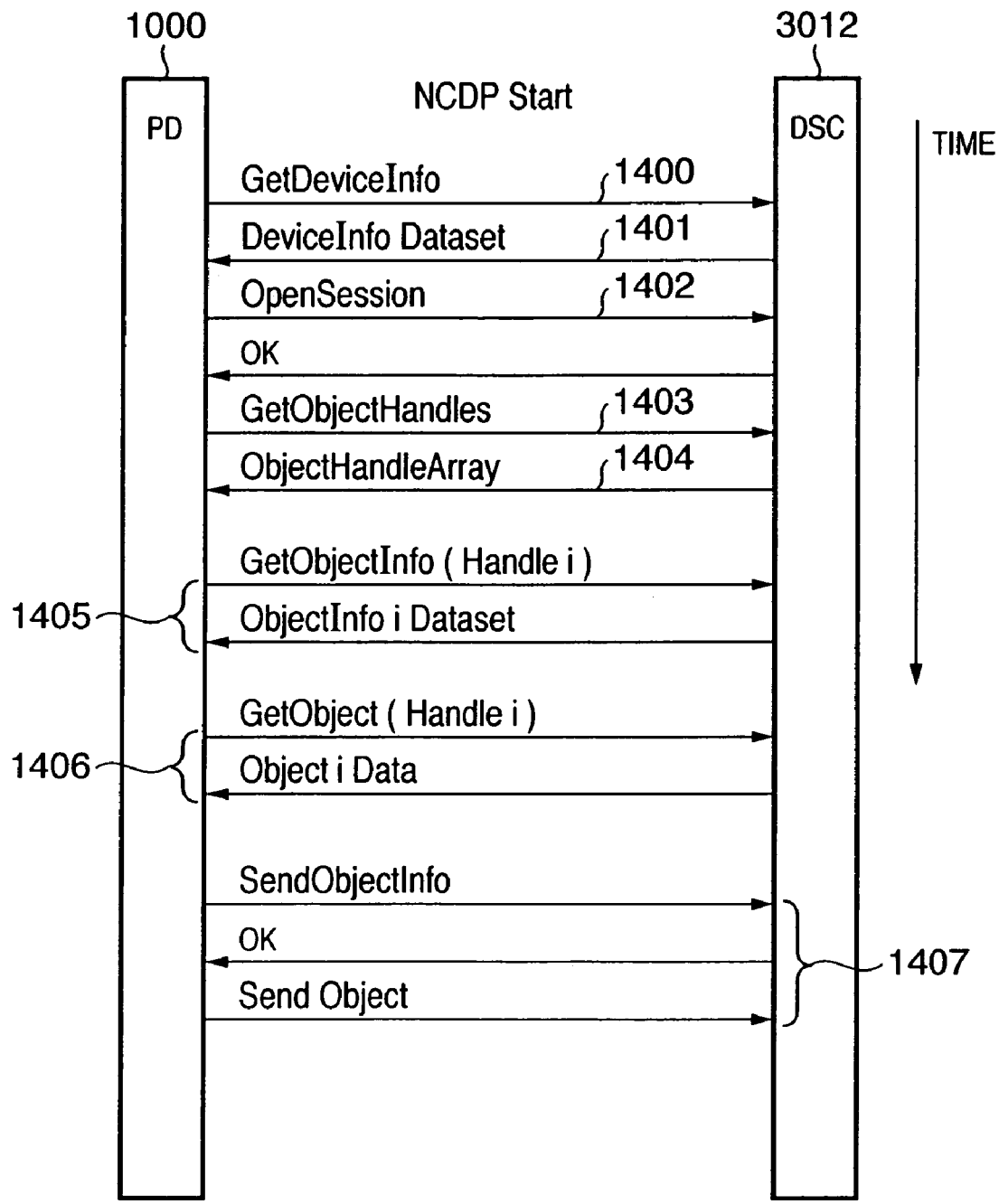
FIG. 14 is a view for explaining an implementation example of a command (NCDPStart) that uses a PTP architecture to instruct start of the NCDP procedure.

FIG. 14 is a view for explaining an implementation example of a command (NCDPStart) that uses the PTP architecture to instructs start of the NCDP procedure.

After the PD printer 1000 and DSC 3012 are physically connected, the PD printer 1000 transmits a command GetDeviceInfo to the DSC 3012 at timing 1400 to request it to send information associated with objects held by the DSC. In response to this command, the DSC 3012 transmits information associated with objects held by it to the PD printer 1000 using DeviceInfo Dataset at timing 1401. At timing 1402, the PD printer 1000 issues a start request OpenSession of a procedure for assigning the DSC 3012 as a resource, assigning handles to data objects as needed, and making a special initialization process. When the DSC 3012 returns an affirmative response (OK) in response to this request, a communication using PTP starts. When the PD printer 1000 requests the DSC 3012 to send all handles in the script format at timing 1403 (Storage ID: FFFFFF, Object Type: Script), the DSC 3012 returns a list of all handles held by it at timing 1404 in response to this request. At timings 1405 and 1406, the PD printer 1000 acquires i-th object handle information from the DSC 3012. If this object contains a keyword (e.g., a character string "NCDP camera") indicating identification of the DSC 3012, the PD printer 1000 sends an object information transmission instruction at timing 1407 (SendObjectInfo). Upon reception of an affirmative response (OK) in response to this instruction, the PD printer 1000 transmits object information to the DSC 3012 using SendObject. This object contains, e.g., a character string "NCDP Printer" as a response keyword (password) to the aforementioned keyword.

In this way, the PD printer 1000 and DSC 3012 can recognize each other's connection partners, and the NCDP procedure (timing 710 in FIG. 7) can start. Keywords can be exchanged reliably as long as the transport layer that can exchange files is installed. That is, keywords can be exchanged without adding a unique command or the like to the NCDP of this embodiment. Note that the keywords are not limited to the aforementioned example, and identical keywords may be exchanged. In order to shorten a negotiation time using keywords, this keyword may be set at the beginning of a handle in the script format, thus shortening the time required for confirming each other's devices.

[ProcedureStart]

Figure 15:
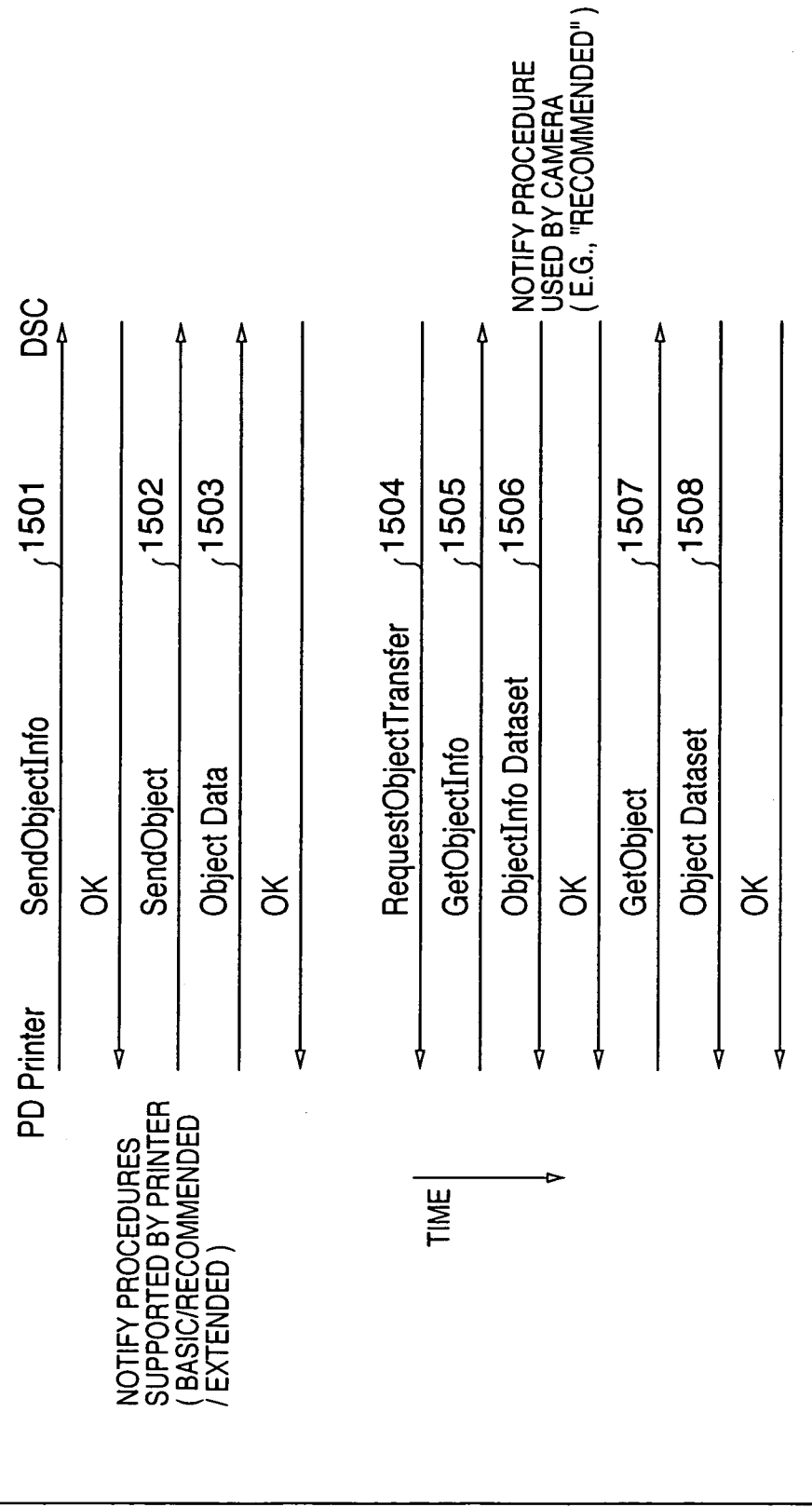
FIG. 15 is a view for explaining an implementation example of a procedure (ProcedureStart) that uses the PTP architecture to receive a transition command to respective procedures from the camera in the NCDP procedure.

FIG. 15 is a view for explaining an implementation example of a command (ProcedureStart) which uses the PTP architecture to start a given mode upon reception of a command that designates a start procedure to that mode from the DSC 3012.

In order to notify the DSC 3012 of procedures "basic procedure", "recommended procedure", and "extended procedure" supported by the PD printer 1000, the printer notifies the DSC 3012 of the presence of object information to be sent to it using a command SendObjectInfo at timing 1501. Upon reception of an affirmative response (OK) from the DSC 3012 in response to this command, the PD printer 1000 sends a message indicating that it is ready to transmit an object to the DSC 3012 using a command SendObject at timing 1502, and then transmits information associated with the procedures supported by itself using ObjectData at next timing 1503. At timing 1504, the DSC 3012 sends a message indicating that a GetObject operation is to be launched (to start a push mode) to the PD printer 1000. In response to this message, when the PD printer 1000 sends a message indicating that it is ready to receive information associated with object information (GetObjectInfo) at timing 1505, the DSC 3012 returns that information to the PD printer 1000 using ObjectInfo Dataset at timing 1506. At timing 1507, the PD printer 1000 designates that object information to request object information itself. As a result, the DSC 3012 informs the PD printer 1000 of procedures ("basic", "recommended", "extended", and the like) that the DSC 3012 uses by Object Dataset (timing 1508).

In this manner, an image print mode can be designated from the DSC 3012 to the PD printer 1000.

[NCDPEnd]

Figure 16:
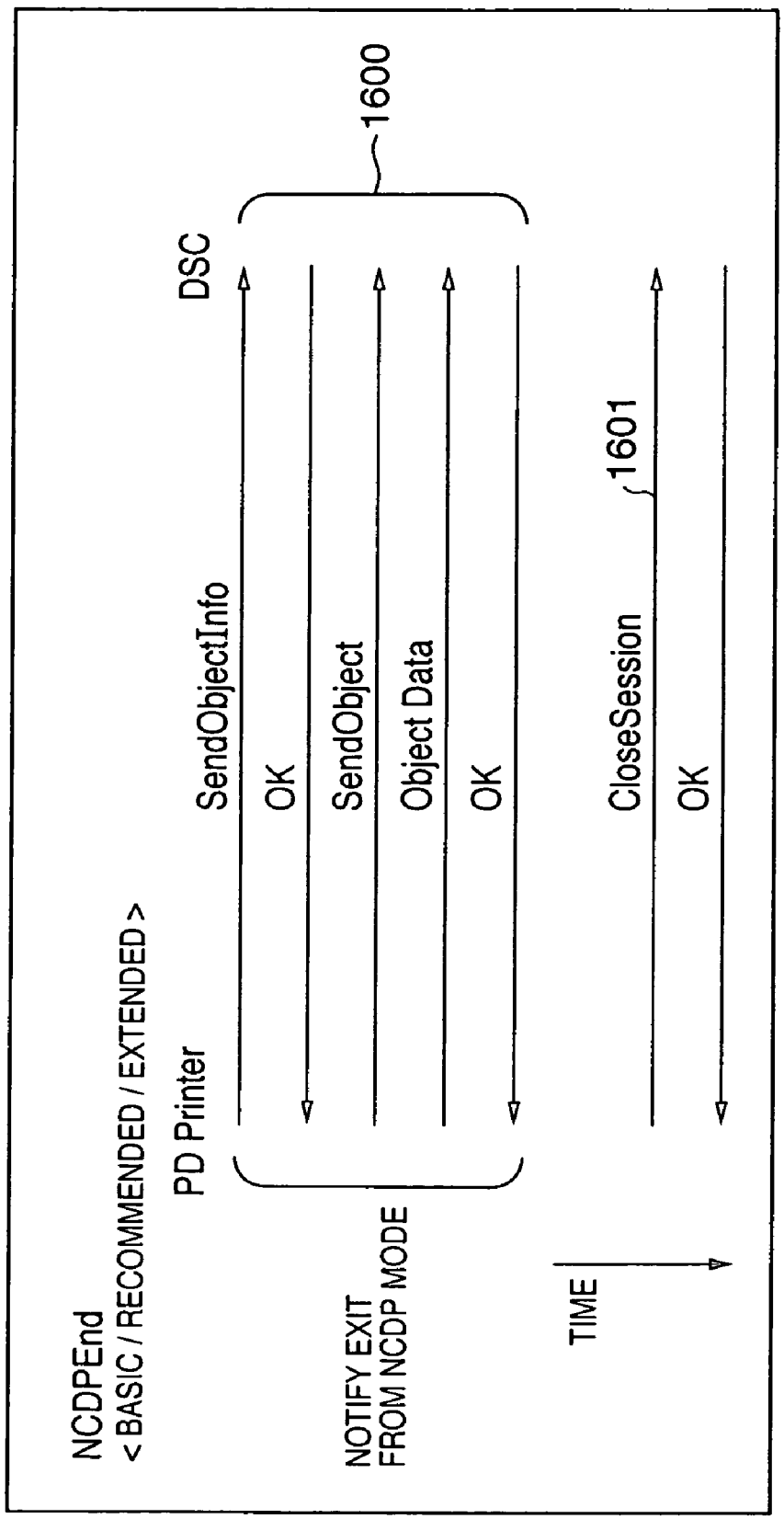
FIG. 16 is a view for explaining an implementation example of a command (NCDPEnd) that uses the PTP architecture to instruct end of the NCDP procedure.

FIG. 16 is a view for explaining an implementation example of a command (NCDPEnd) which uses the PTP architecture to end the NCDP communication control procedures in this embodiment.

In this procedure, the PD printer 1000 informs the DSC 3012 of the presence of object information to be sent to it at timing 1600, and notifies the DSC 3012 that it leaves the NCDP mode using ObjectData. Upon reception of an affirmative response (OK) in response to this command, the PD printer 1000 transmits CloseSession at timing 1601 to end this communication. In this way, the NCDP communication procedures end.

[Capability]

Figure 17:
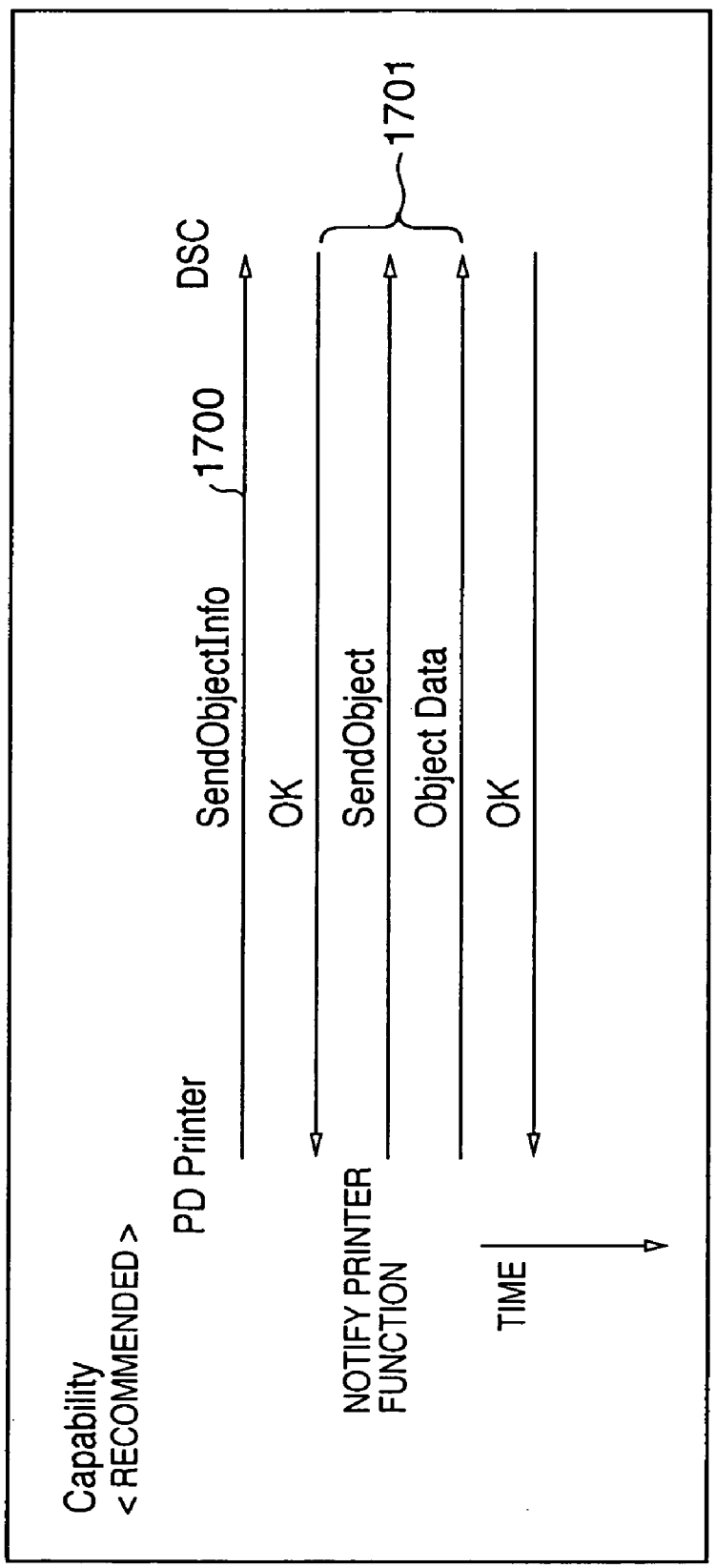
FIG. 17 is a view for explaining an implementation example of a command (Capability) that uses the PTP architecture to transmit Capability from the PD printer to the camera in the NCDP procedure.

FIG. 17 is a view for explaining an implementation example of communication procedures in a Capability command which uses the PTP protocol to notify the DSC 3012 of the functions of the PD printer 1000 in NCDP according to this embodiment.

In this procedure, the PD printer 1000 informs the DSC 3012 of the presence of object information to be sent to it using a command SendObjectInfo at timing 1700. The PD printer 1000 notifies the DSC 3012 that it is ready to transmit object information using a command SendObject, and then transmits information about its functions to the DSC 3012 in a script format (FIG. 12) using Object Data at timing 1701.

[GetImage]

Figure 18:
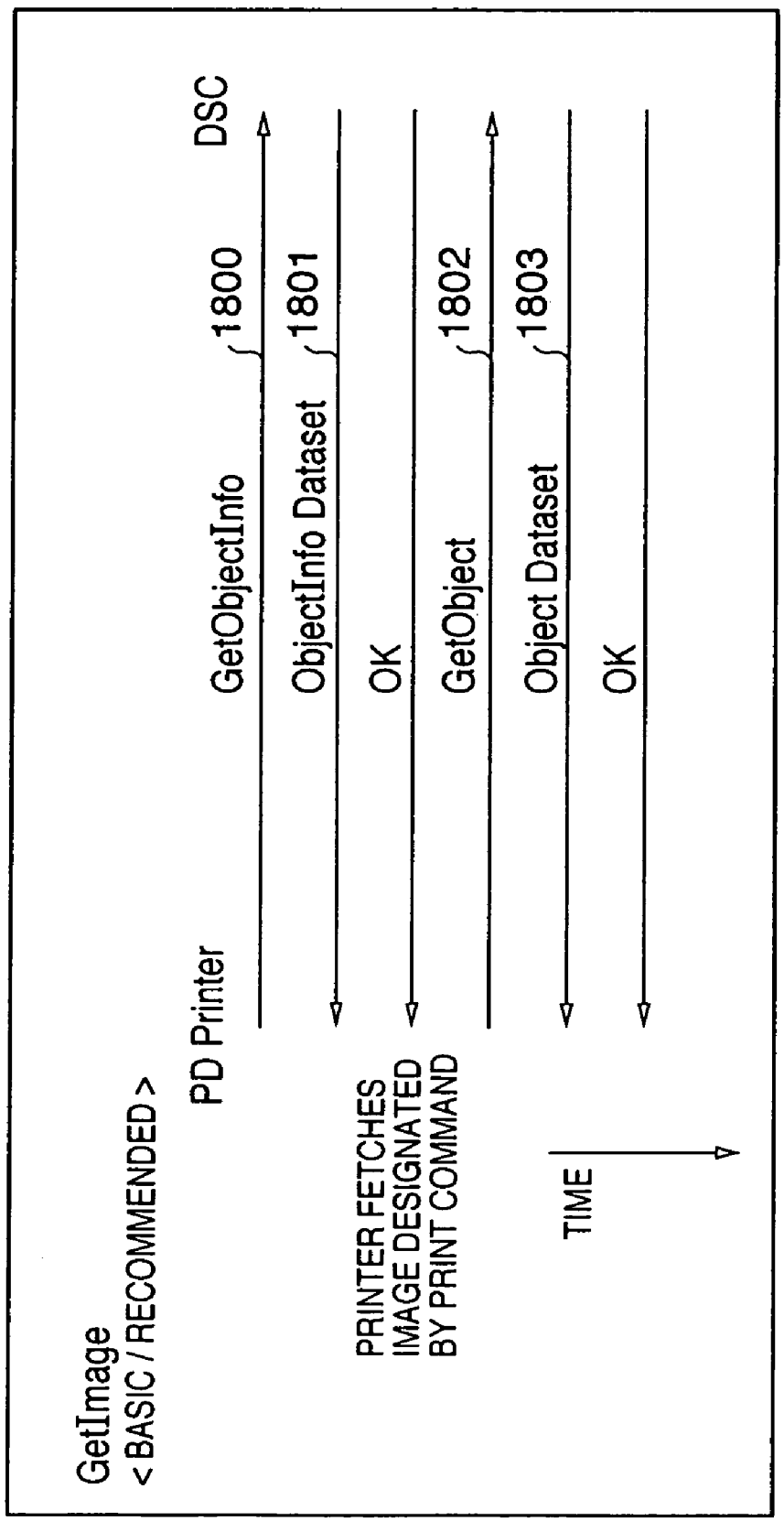
FIG. 18 is a view for explaining an implementation example of a procedure of a command (GetImage) that uses the PTP architecture to acquire an image file held in the camera from the PD printer in the NCDP procedure.

FIG. 18 is a view for explaining an implementation example of communication procedures when the PD printer 1000 uses the PTP protocol to acquire image data (JPEG image) held by the DSC 3012 (GetImage) in NCDP according to this embodiment.

Upon sending a request of information associated with an object held by the DSC 3012 at timing 1800, the DSC 3012 sends information (Object Dataset) associated with that object to the PD printer 1000 at timing 1801. When the PD printer 1000 issues an acquisition request (GetObject) by designating that object at timing 1802, the DSC 3012 transmits the requested image file (Object Dataset) to the PD printer 1000 at timing 1803. In this way, the PD printer 1000 can acquire a desired image file from the DSC 3012.

[StatusSend]

Figure 19:
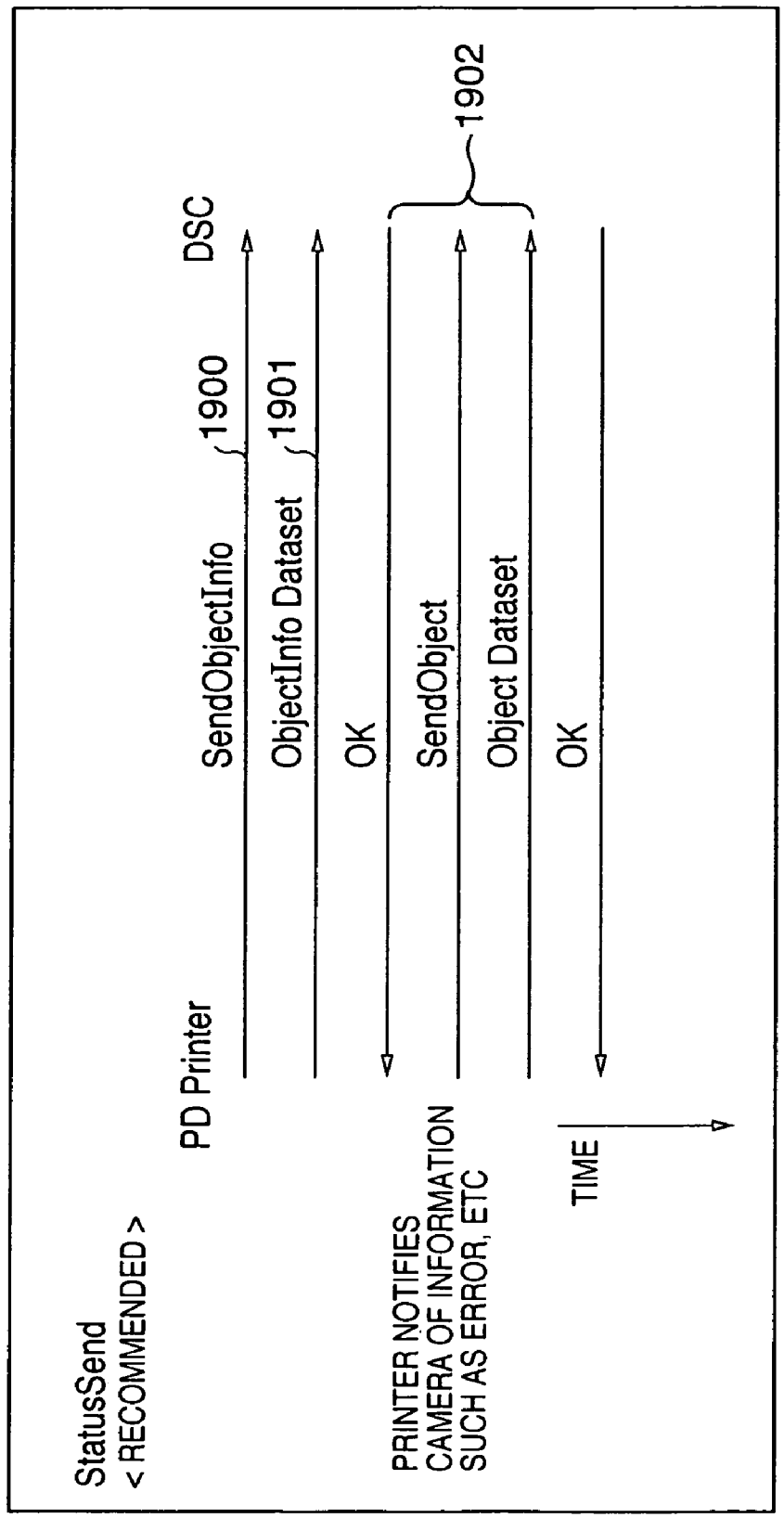
FIG. 19 is a view for explaining an implementation example of a procedure of a command (StatusSend) that uses the PTP architecture to transmit error status from the PD printer to the camera in the NCDP procedure.

FIG. 19 is a view for explaining an implementation example of communication procedures when the PD printer 1000 uses the PTP protocol to notify the DSC 3012 of error status or the like (StatusSend) in NCDP according to this embodiment.

The PD printer 1000 notifies the DSC 3012 of the presence of object information to be sent to it using SendObjectInfo at timing 1900. Then, the PD printer 1000 transmits an information set (Object Dataset) associated with that object information to the DSC 3012 at timing 1901. In response to an affirmative response (OK) from the DSC 3012, the PD printer 1000 transmits its status information of errors or the like using SendObject and Object Dataset at timing 1902.

[PageEnd]

Figure 20:
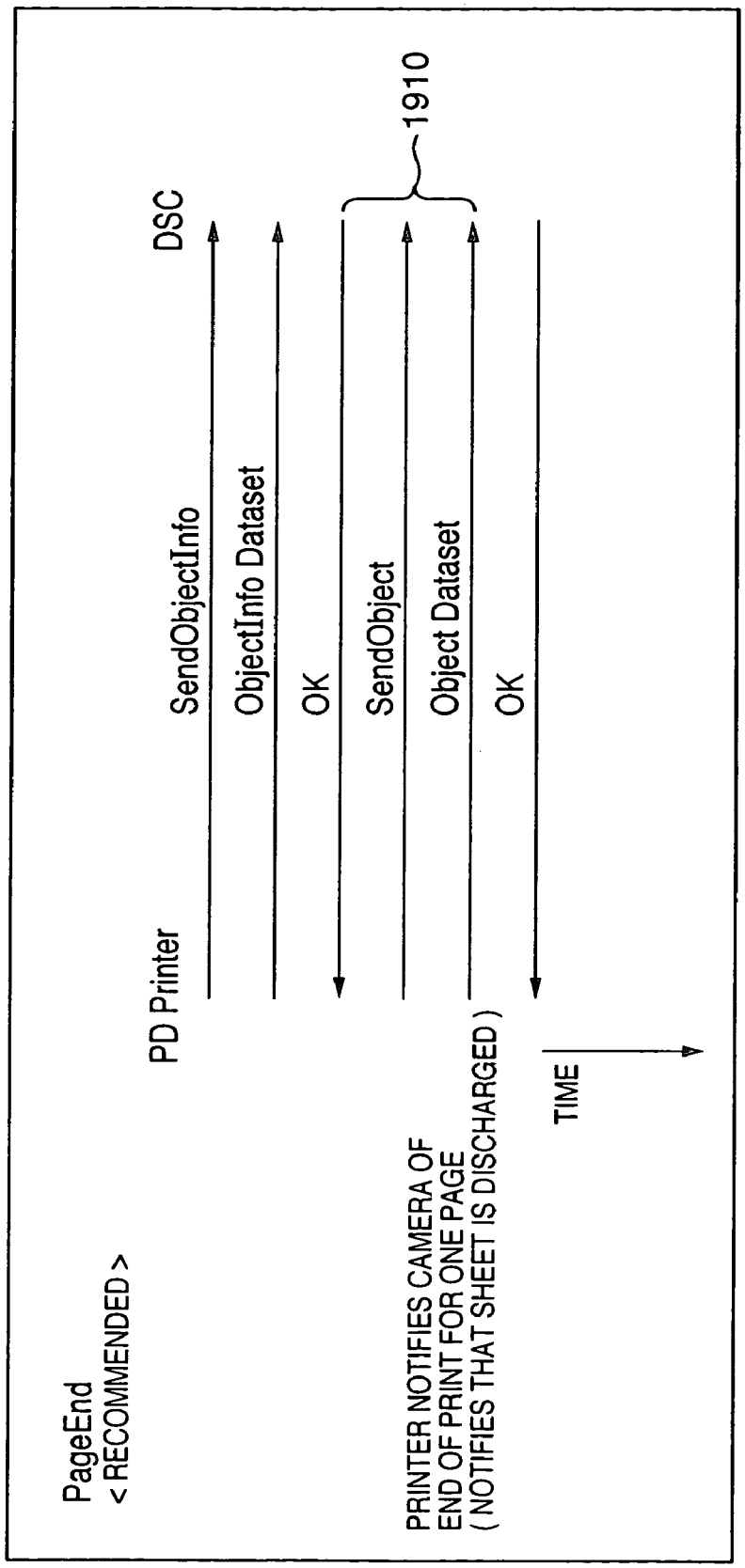
FIG. 20 is a view for explaining an implementation example of a procedure that uses the PTP architecture to transmit an end command (PageEnd) of a print process for one page from the PD printer to the camera in the NCDP procedure.

FIG. 20 is a view for explaining an implementation example of communication procedures when the PD printer 1000 uses the PTP protocol to notify the DSC 3012 of the end of a print process for one page (PageEnd) in NCDP according to this embodiment.

[JobEnd]

Figure 21:
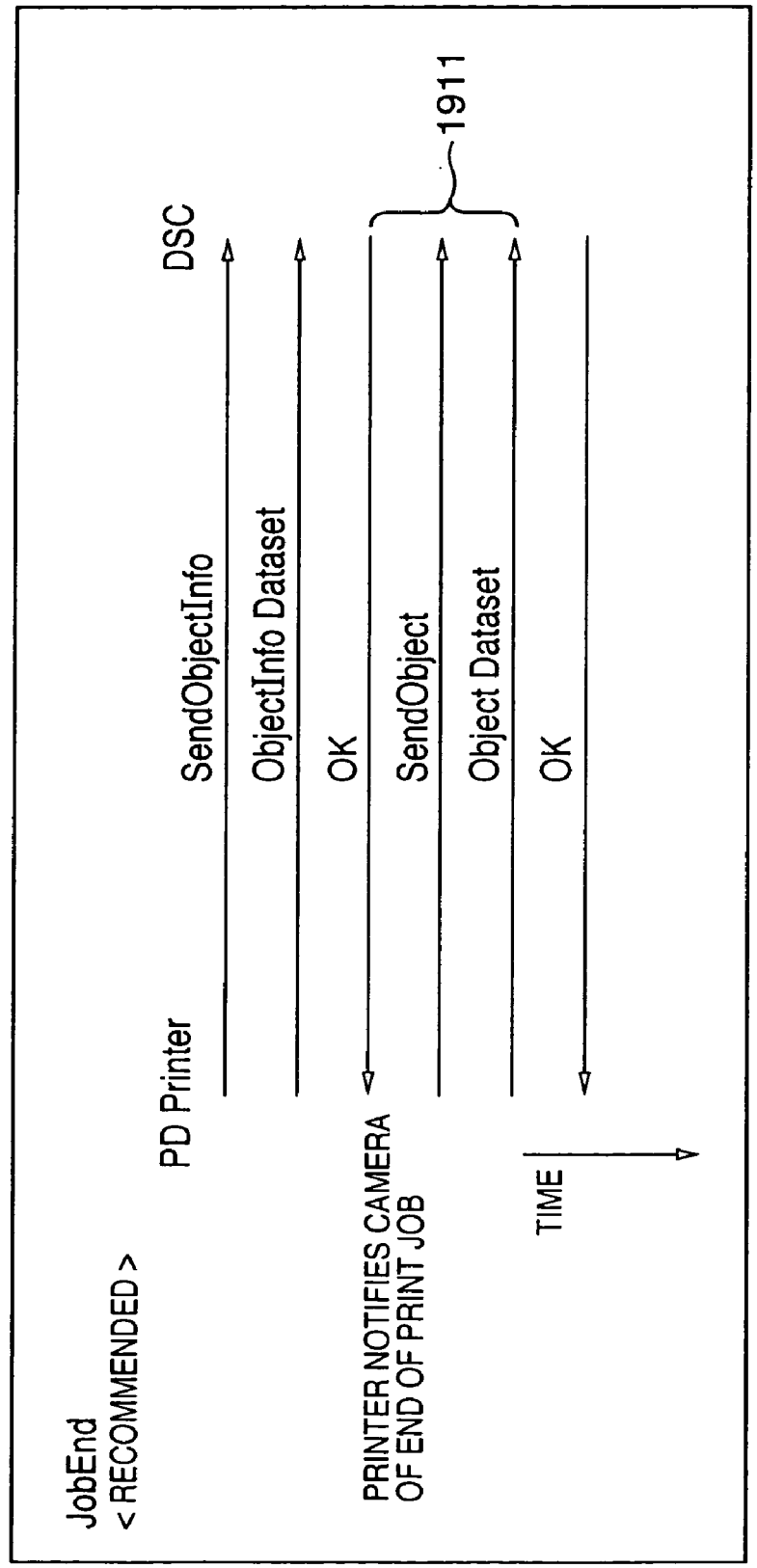
FIG. 21 is a view for explaining an implementation example of a procedure that uses the PTP architecture to issue an end command (JobEnd) of a print job from the PD printer to the camera in the NCDP procedure.

FIG. 21 is a view for explaining an implementation example of communication procedures when the PD printer 1000 uses the PTP protocol to notify the DSC 3012 of the end of a print job (JobEnd) in NCDP according to this embodiment.

In FIGS. 20 and 21, after execution of procedures shown at timings 1900 and 1901 in FIG. 19, the PD printer 1000 notifies the DSC 3012 of the end of the print process for one page at timing 1910 in FIG. 20, or notifies the DSC 3012 of the end of the print job at timing 1911 in FIG. 21.

[JobStart]

Figure 22:
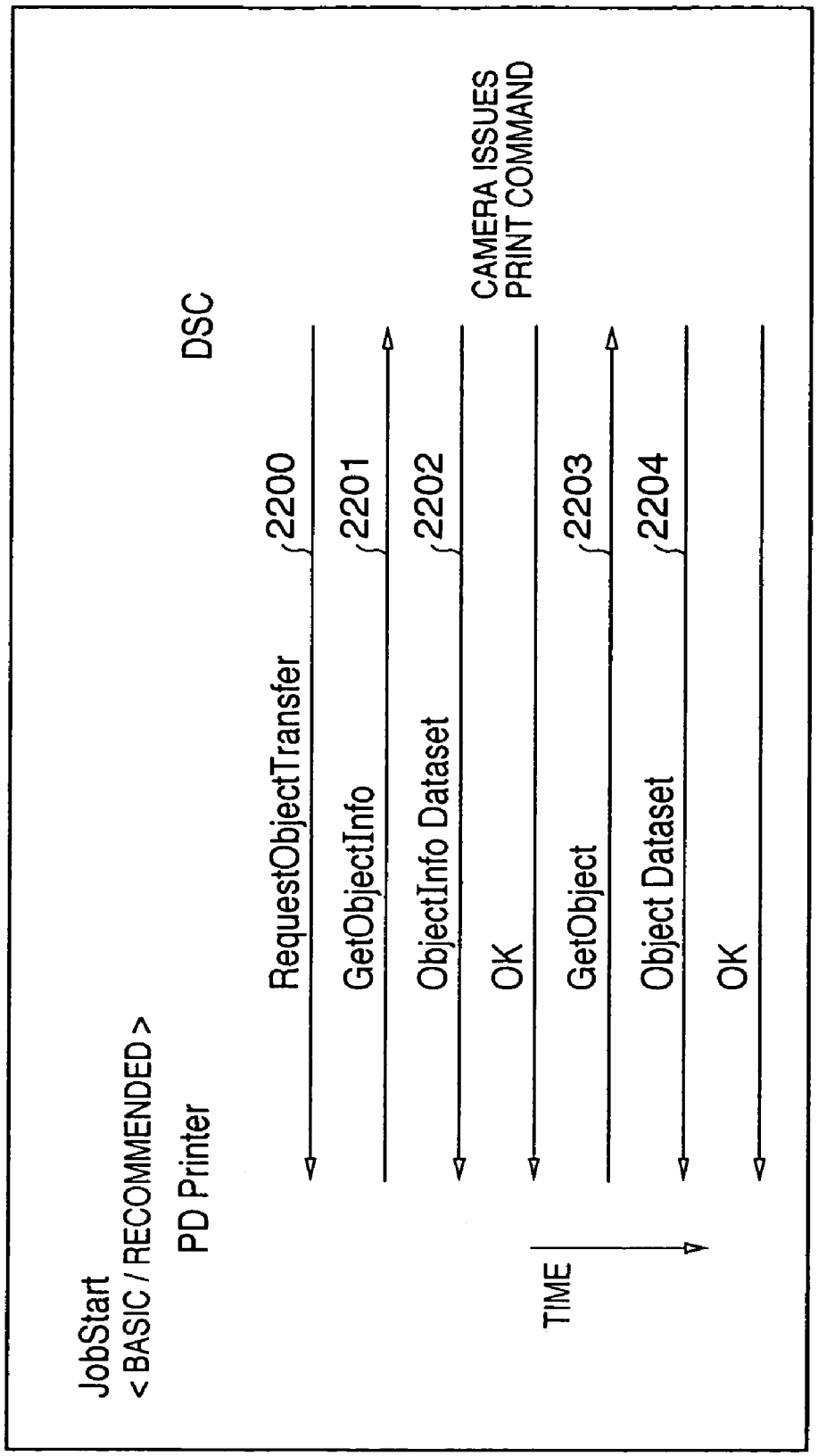
FIG. 22 is a view for explaining an implementation example of a procedure that uses the PTP architecture to issue a print command (JobStart) from the camera to the PD printer in the NCDP procedure.

FIG. 22 is a view for explaining an implementation example of communication procedures when the DSC 3012 uses the PTP protocol to notify the PD printer 1000 of the start of a print job (JobStart) in NCDP according to this embodiment.

The DSC 3012 sends RequestObjectTransfer defined to the PD printer 1000 at timing 2200 so as to urge the PD printer 1000 to issue a GetObject command. As a result, when the PD printer 1000 issues GetObjectInfo at timing 2201, the DSC 3012 transmits information associated with object information to be transmitted (timing 2202). In response to this information, since the PD printer 1000 requests object information (GetObject) at timing 2203, the DSC 3012 issues (transmits) data that describes a print command to the PD printer 1000 at timing 2204.

[JobAbort]

Figure 23:
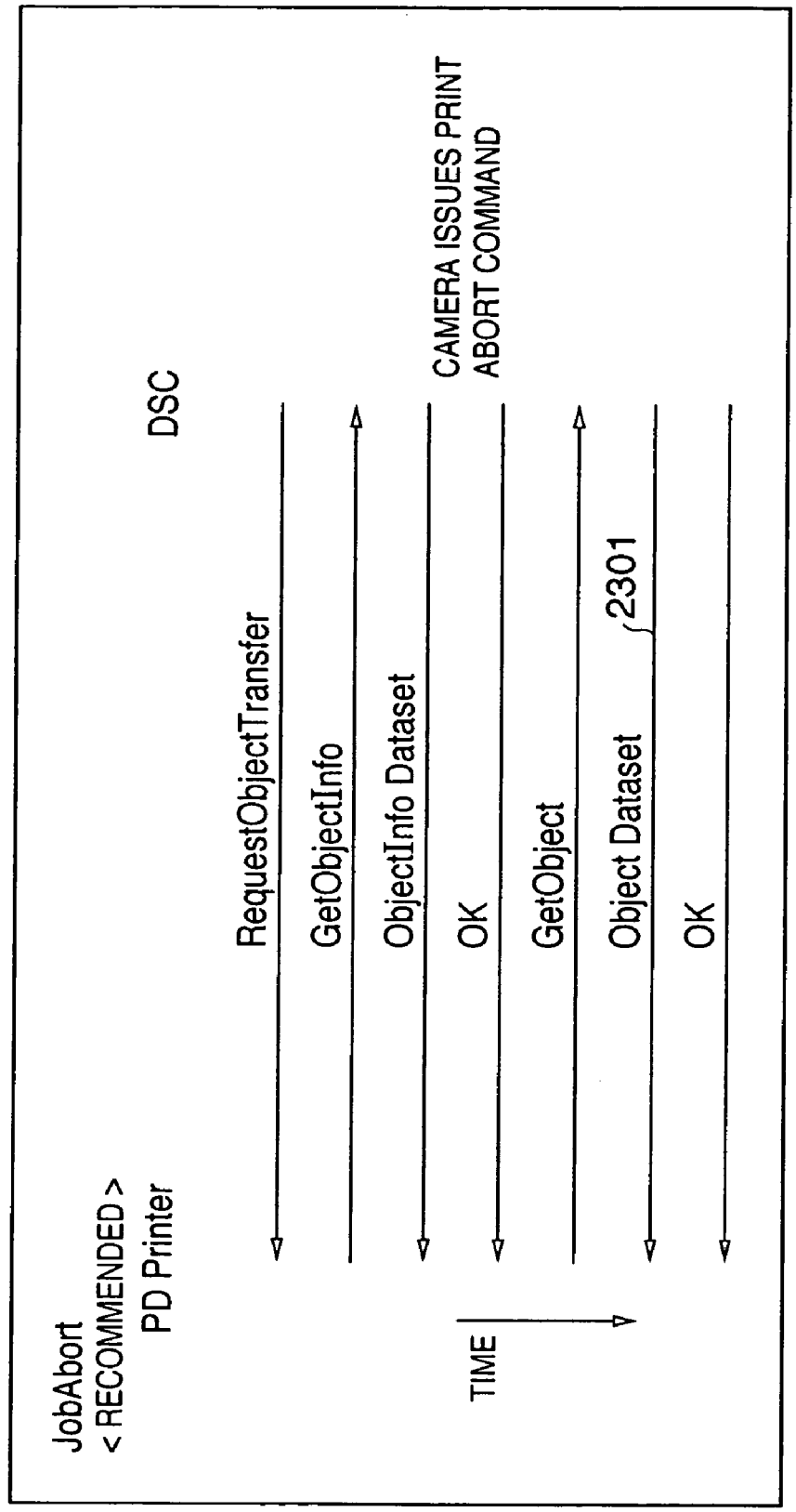
FIG. 23 is a view for explaining an implementation example of a procedure that uses the PTP architecture to issue a print abort command (JobAbort) from the camera to the PD printer in the NCDP procedure.

FIG. 23 is a view for explaining an implementation example of communication procedures when the DSC 3012 uses the PTP protocol to issue a print abort command to the PD printer 1000 (JobAbort) in NCDP according to this embodiment. Basically, the DSC 3012 notifies the PD printer 1000 of the presence of an object to be transmitted. As a result, since the PD printer 1000 sends an object transmission request (Get Object) to the DSC 3012, the DSC 3012 transmits data that describes a print abort command as Object Dataset at timing 2301.

[JobContinue]

Figure 24:
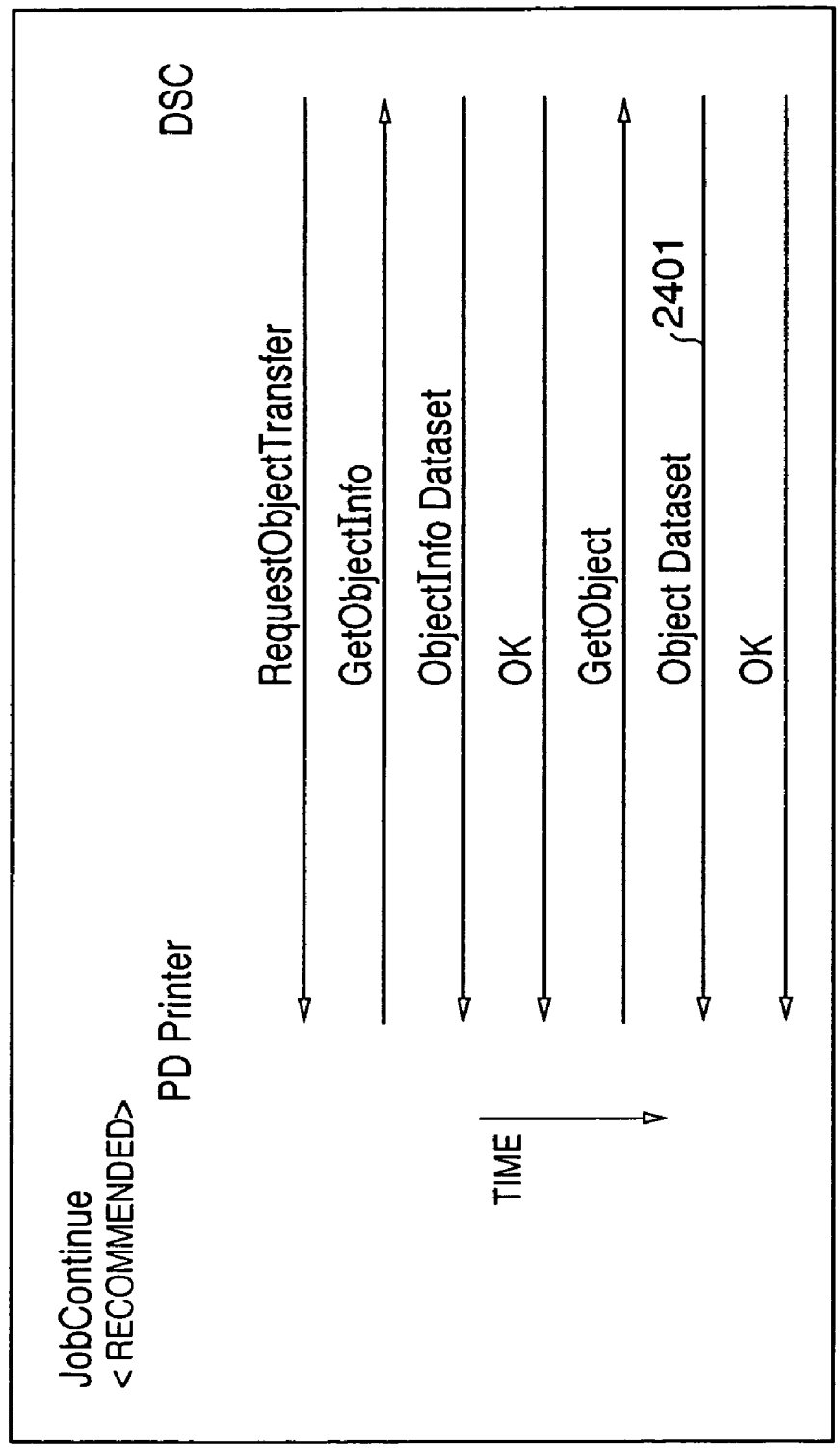
FIG. 24 is a view for explaining an implementation example of a procedure that uses the PTP architecture to issue a print restart command (JobContinue) from the camera to the PD printer in the NCDP procedure.

FIG. 24 is a view for explaining an implementation example of communication procedures when the DSC 3012 uses the PTP protocol to issue a print restart command to the PD printer 1000 (JobContinue) in NCDP according to this embodiment.

In FIGS. 23 and 24, after procedures at timings 2200 to 2203 in FIG. 22 are executed, the DSC 3012 issues a print abort command to the PD printer 1000 at timing 2301 in FIG. 23, or sends a print restart command to the PD printer 1000 at timing 2401 in FIG. 24.

[Discretion of Capability]

Communication procedures between the PD printer 1000 and DSC 3012 and processes in the PD printer 1000 and DSC 3012 as characteristic features according to this embodiment will be described hereinafter.

The PD printer 1000 of this embodiment corrects image data sent from the DSC 3012 connected to it, and outputs the corrected image data. As described above, the PD printer 1000 transmits information associated with image correction processes that can be made by itself to the digital camera (DSC) 3012 using Capability information. Note that the information to be transmitted contains the following items:

ON/OFF of image correction

Type of image correction

Types of image feature amounts used in image correction

Colorimetric system of feature amounts

Since this embodiment is premised on that an unspecified digital camera manufactured by each manufacturer is connected as the DSC 3012 to the PD printer 1000, even when the PD printer 1000 transmits information about its all functions to the DSC 3012 as Capability information, the DSC 3012 cannot often interpret all or some contents of that Capability information. In such case, a print job file that describes a print condition which is not intended by the PD printer 1000 may be sent from the DSC. If a print process is done under the print condition designated by that print job file, a printed image itself may become nonsense. Hence, this embodiment can also solve problems posed in such state.

Figure 25:
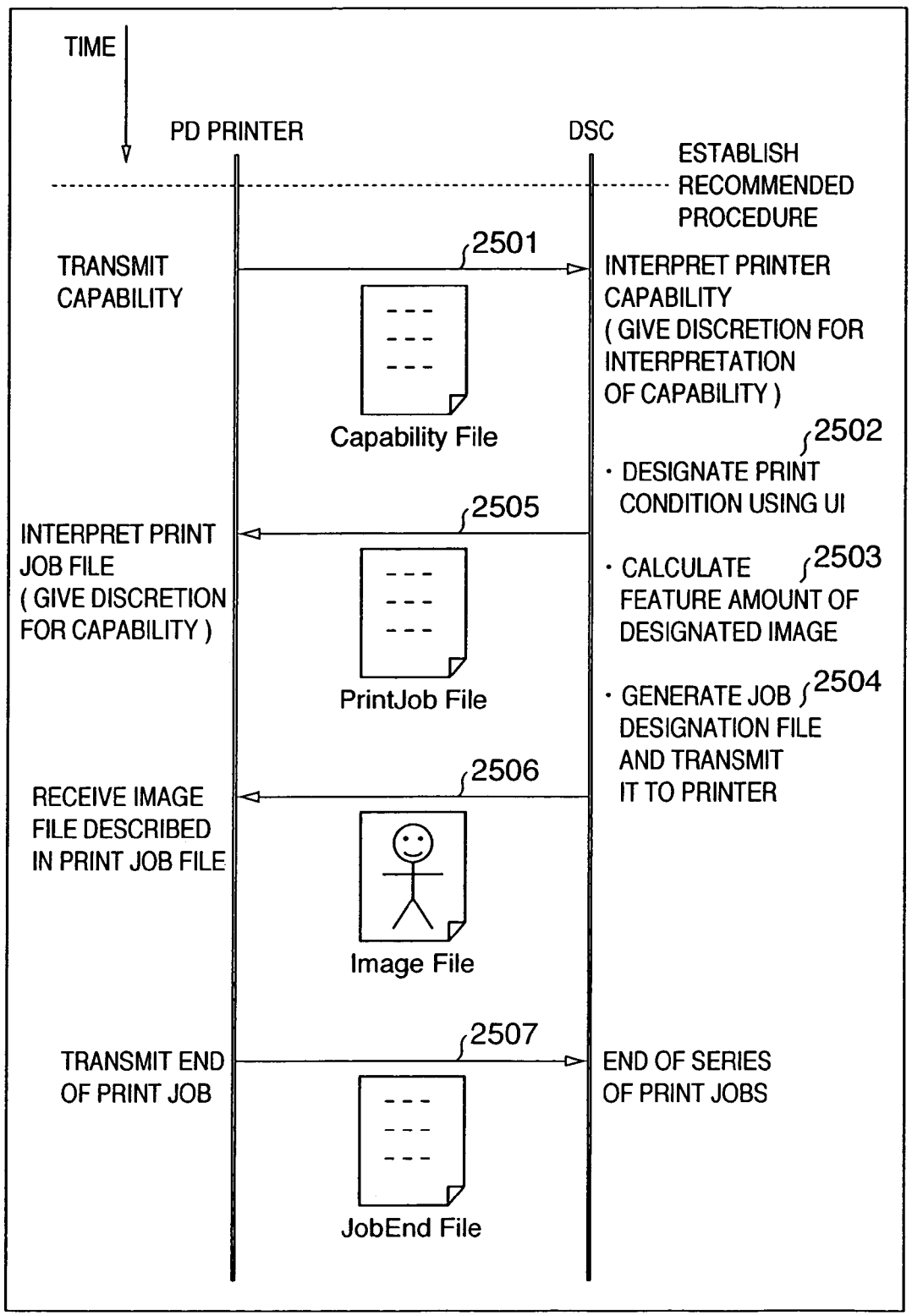
FIG. 25 is a chart for explaining data exchange in "recommended procedure" between the digital camera (DSC) and PD printer according to the embodiment of the present invention.

FIG. 25 is a chart for explaining the Capability exchange sequence in "recommended procedure" shown in FIG. 11.

Referring to FIG. 25, the PD printer 1000 transmits Capability information in the script format to the DSC 3012 at timing 2501, as described above. The script of this Capability information includes items associated with image correction, and describes the following information about image correction.

image correction: ON/OFF
    Type of image correction: Auto (printer auto)
    Types of image feature amounts used in image correction: lightness histogram/saturation histogram/hue histogram
    Colorimetric system of feature amounts: YCC For example, by assigning, defining, and specifying these four items to a 4-byte value, the script size to be transmitted can be reduced. An example will be described below.

First byte: ON/OFF of image correction
    OFF: 80, ON: 81
    Second byte: type of image correction
    Auto: FF
    Color cast correction: 01
    Sharpness correction: 02
    Gamma correction: 04
    Third Byte: types of image feature amounts used in image correction
    Lightness histogram: 01
    Saturation histogram: 02
    Hue histogram: 04
    Density histogram: 08
    Color deviation amount of white point: 10
    Color deviation amount of black point: 20
    Fourth byte: colorimetric system of image feature amounts
    RGB system: 01
    XYZ system: 02
    Lab system: 04
    YCbCr system: 08

As for items associated with the type of image correction and the types of image feature amounts used in image correction, actual setting contents are assigned to respective bits in each byte. These item setting contents are independent from each other, and are often set at the same time. In this case, the item of interest is set by calculating an OR of the contents. For example, the third byte "types of image feature amounts used in image correction" will be exemplified below. Assuming that the PD printer can simultaneously support "lightness histogram", "saturation histogram", and "hue histogram" at the same time in this item, the above code has:

First bit: "lightness histogram"
    Second bit: "saturation histogram"
    Third bit: "hue histogram"
    Fourth bit: "density histogram"
    Fifth bit: "color deviation amount of white point"
    Sixth bit: "color deviation amount of black point"

Hence, the setting value of the third byte is given by:

(code of "lightness histogram")+(code of "saturation histogram")+(code of "hue histogram")=01+02+04=07

In this manner, simultaneously relevant items can be easily interpreted by interpreting corresponding bits.

As a result, in the above example, the PD printer 1000 sends a code "81FF0708" to the DSC 3012 as Capability of image correction.

The DSC 3012 interprets this Capability. The DSC 3012 compares this Capability from the printer with functions that can be supported by itself, and prepares for a print process in correspondence with matched items. Furthermore, the DSC 3012 ignores an item that it cannot interpret. For example, if the DSC 3012 itself does not prepare for a select item "type of image correction", it can ignore information of the third byte. The DSC 3012 compares respective items of the Capability from the PD printer with its own functions, and determines the following setup used in the current print process on the basis of the matched items. This setup is expressed by "81FF0108" by the above code.

Image correction: ON
    Type of image correction: auto
    Type of image feature amount: lightness histogram
    Colorimetric system: YCbCr The user of the DSC 3012 designates an image file to be printed and its print condition using the UI of this DSC 3012. The DSC 3012 calculates the previously determined image feature amount (lightness histogram) of the designated image file, and stores that feature amount in its memory as a file in association with the designated image file. The DSC 3012 generates a print job file that designates a print job at timing 2504. This job file describes information associated with image correction. The DSC 3012 embeds the setup associated with image correction, and the file name that saves the calculation result of the image feature amount associated with this image in this job file together with information of the image file.

The DSC 3012 transmits the print job file as an object to the PD printer 1000 at timing 2505 in, e.g., the sequence shown in FIG. 22. Upon reception of this file, the PD printer 1000 interprets the contents described in that print job file.

At timing 2506, the PD printer 1000 acquires the image file itself and the file that saves the corresponding image feature amount from the DSC 3012 on the basis of the print condition and image correction condition designated by that print job file, and prints that image file. Upon completion of the print process, the PD printer 1000 notifies the DSC 3012 of the end of the print job at timing 2507.

Figure 30:
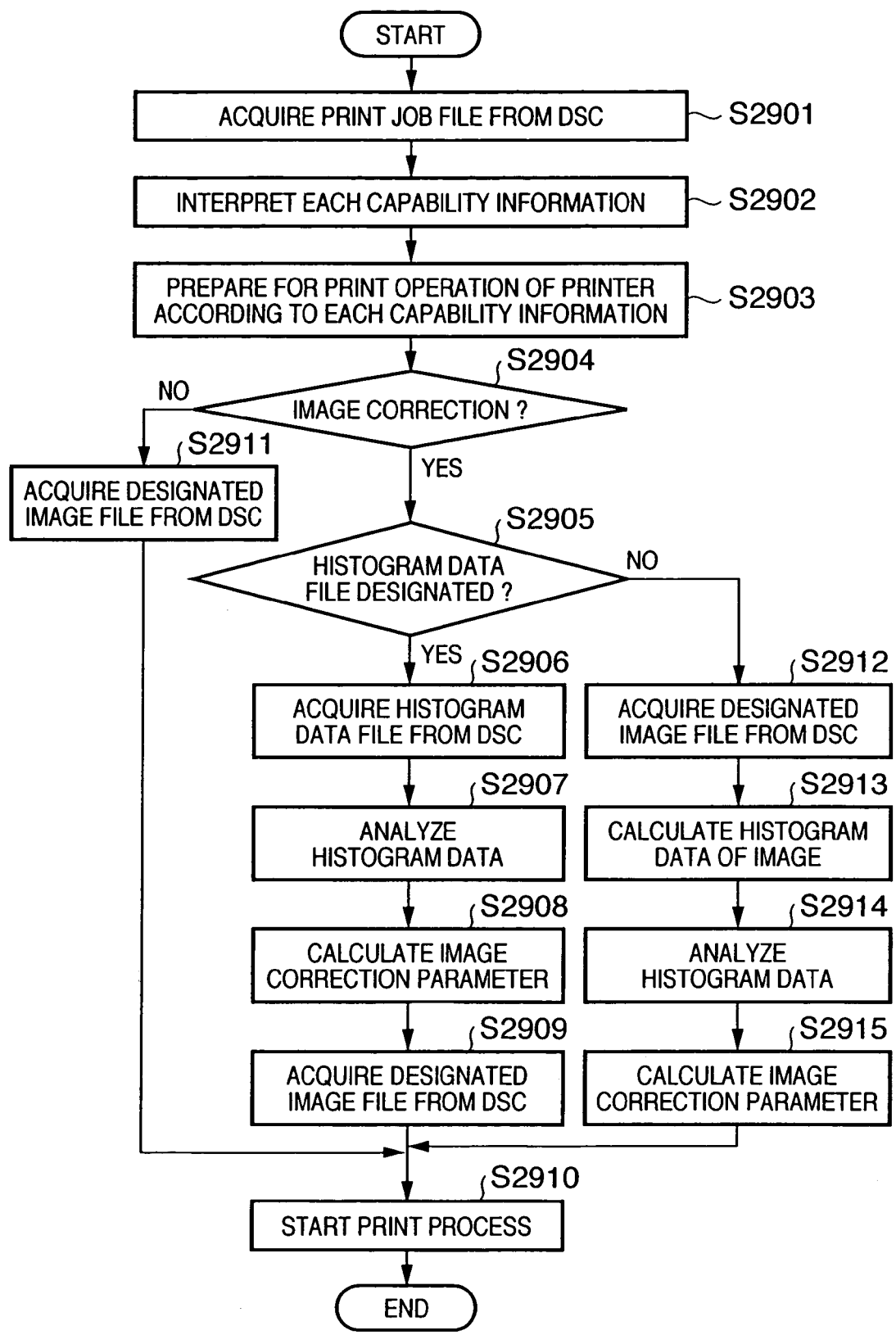
FIG. 30 is a flow chart showing the processing sequence of the PD printer according to the embodiment of the present invention.

The processing contents in the PD printer 1000 upon reception of the print job file, histogram data file, and image file at timings 2505 and 2506 in FIG. 25 will be described below with reference to the flow chart of FIG. 30.

A case will be explained below wherein histogram data and image data are independently designated in the print job file, and the PD printer 1000 acquires respective files from the DSC 3012.

The PD printer 1000 acquires the print job file from the DSC 3012 (step S2901). The PD printer 1000 then interprets respective pieces of Capability information described in that print job file (step S2902), and makes various setups (e.g., paper type and size, trimming information, and the like) required for the printer to start a print operation in accordance with the Capability information as the interpretation result (step S2903). In this case, if no Capability is set, or if items that can be uniquely determined by the printer such as a Default setup are found, the printer also sets these items. If Capability information associated with image correction is found, the printer sets various parameters according to that information. Note that various parameters include the aforementioned information, i.e., image correction (On/Off/Default), the type of image correction, the types of image feature amounts, a colorimetric system, and the like. As for the item of image correction, especially, if the print job file has no designation or a default setup is selected, it is determined that image correction is to be done automatically, and subsequent processes are executed. However, how to deal such information is not directly related to the scope of the present invention, and image correction may be skipped depending on some vendors.

It is checked whether or not designation indicating if image correction is ON/OFF is found (step S2904). If image correction is OFF, the PD printer 1000 acquires the image file designated in the print job file from the DSC 3012 (step S2911), and starts a print process (step S2910).

On the other hand, if it is determined in step S2904 that image correction is ON, the flow advances to step S2905 to check if a histogram data file is designated in the print job file. If a histogram data file is designated, the PD printer 1000 acquires that histogram data file from the DSC 3012 (step S2906), analyzes histogram data in the acquired histogram data file (step S2907), and calculates image correction parameters on the basis of the analysis result of the histogram data (step S2908). Then, the PD printer 1000 acquires the image file designated in the print job file from the DSC 3012 (step S2909), and starts a print process (step S2910).

If it is determined in step S2905 that no histogram data file is designated in the print job file, the flow advances to step S2912 to acquire the image file designated in the print job file from the DSC 3012. In step S2913, the PD printer 1000 unin- analyzes a histogram based on the acquired image file, and calculates histogram data. The PD printer 1000 then analyzes the calculated histogram data (step S2914), and calculates image correction parameters on the basis of the analysis result of the histogram data (step S2915). In this case, since the image file has already been acquired from the DSC 3012 in step S2912, the PD printer 1000 can start a print process in step S2910.

In this way, when data (e.g., a histogram file) indicating an image feature amount for correction is designated as a job, the printer downloads the data indicating the image feature amount prior to image data to be printed, thus allowing a correction process while downloading image data.

When the PD printer 1000 can receive "lightness histogram" as an image correction amount, as described above, but Capability information in the print job file received from the DSC 3012 designates "density histogram", a description in Capability of the PD printer 1000 is arbitrarily determined. That is, if that image data is to be printed after image correction, an image cannot often be normally printed. Hence, the PD printer 1000 ignores this item described in Capability information from the DSC 3012, acquires an image file, and generates "lightness histogram" by analyzing the image.

The same applies to Capability information associated with other image correction items. As for Capability about an image correction method, when only "color cast correction" is available in the PD printer 1000, if "gamma correction" is designated in the Capability information in the print job file received from the DSC 3012, a description in Capability of the PD printer 1000 is arbitrarily determined. That is, the PD printer 1000 may output an image while skipping image correction or after image correction of "color cast correction". At this time, when image correction of "color cast correction" is to be further made, the histogram file may describe only "lightness histogram" required for "gamma correction". In this case, the "gamma correction" process uses "lightness histogram" data in the histogram file. As for "color cast correction", the PD printer 1000 executes required image analysis to extract image feature amounts ("saturation histogram" and "hue histogram" in this case), and executes "color cast correction" using the extraction results. That is, the PD printer 1000 itself extracts image feature amounts in addition to those transmitted from the DSC, and image correction is done using one or both of these image feature amounts.

Figure 31:
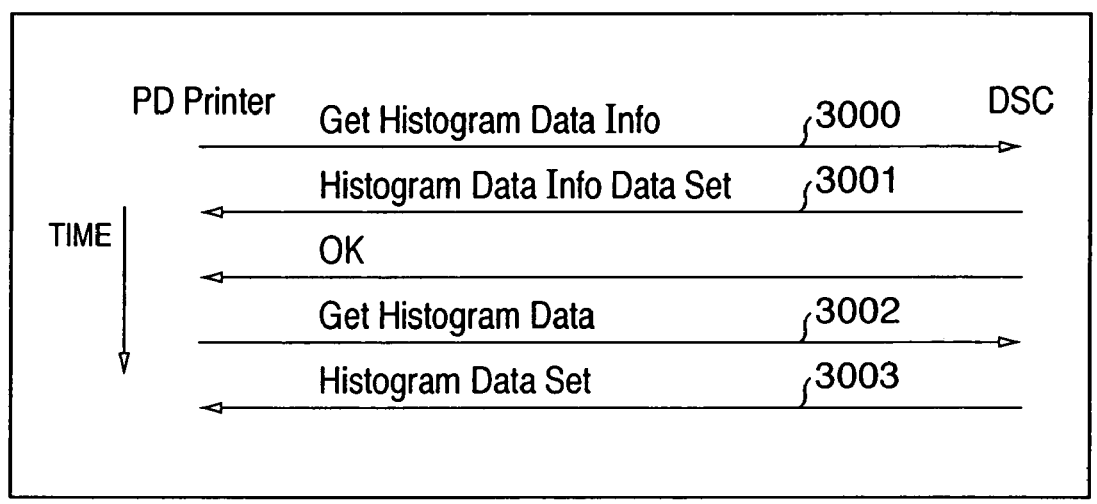
FIG. 31 is a chart showing a sequence upon sending a histogram request from the PD printer to the camera according to the embodiment of the present invention.

When the PD printer 1000 receives a dedicated histogram data file generated by the DSC 3012, communications can be made between these devices in accordance with the PTP architecture shown in FIG. 31.

The PR printer 1000 requests the DSC 3012 to send information associated with a histogram data file held by the DSC 3012 (Get HistogramData Info) at timing 3000. As a result, the DSC 3012 sends that information (HistogramData Info Dataset) associated with a histogram data file to the PD printer 1000 at timing 3001. Since the printer 1000 can detect the location of the histogram held by the DSC 3012 based on this information, it requests the DSC 3012 to send that target histogram (Get HistogramData) at timing 3002. In response to this request, the DSC 3012 transmits the designated histogram data file (HistogramDataSet) at timing 3003. The PD printer 1000 can receive and acquire that file.

The processes in the DSC 3012 in the processing sequence based on "recommended procedure" will be described below with reference to the flow chart of FIG. 26.

Upon reception of Capability information from the PD printer 1000 in step S21, the flow advances to step S22, and the DSC 3012 interprets that Capability information. If uninterpretable items are found, the DSC 3012 ignores them. The flow advances to step S23 to display a print instruction window (UI) on the display unit of the camera 3012. In step S24, the DSC 3012 prompts the user to input a print instruction using that UI window. After the print instruction is input, the DSC 3012 calculates image feature amounts (histograms and the like) of respective pixels of an image in the designated file in step S25. After the flow advances to step S26, the DSC 3012 generates a print job file that describes the image file to be printed, various print conditions, and the like, which are set using the UI, and transmits that print job file to the PD printer 1000 in step S27. Finally, the DSC 3012 transmits the image file described in that print job file to the PD printer 1000 in step S28.

Figure 29:
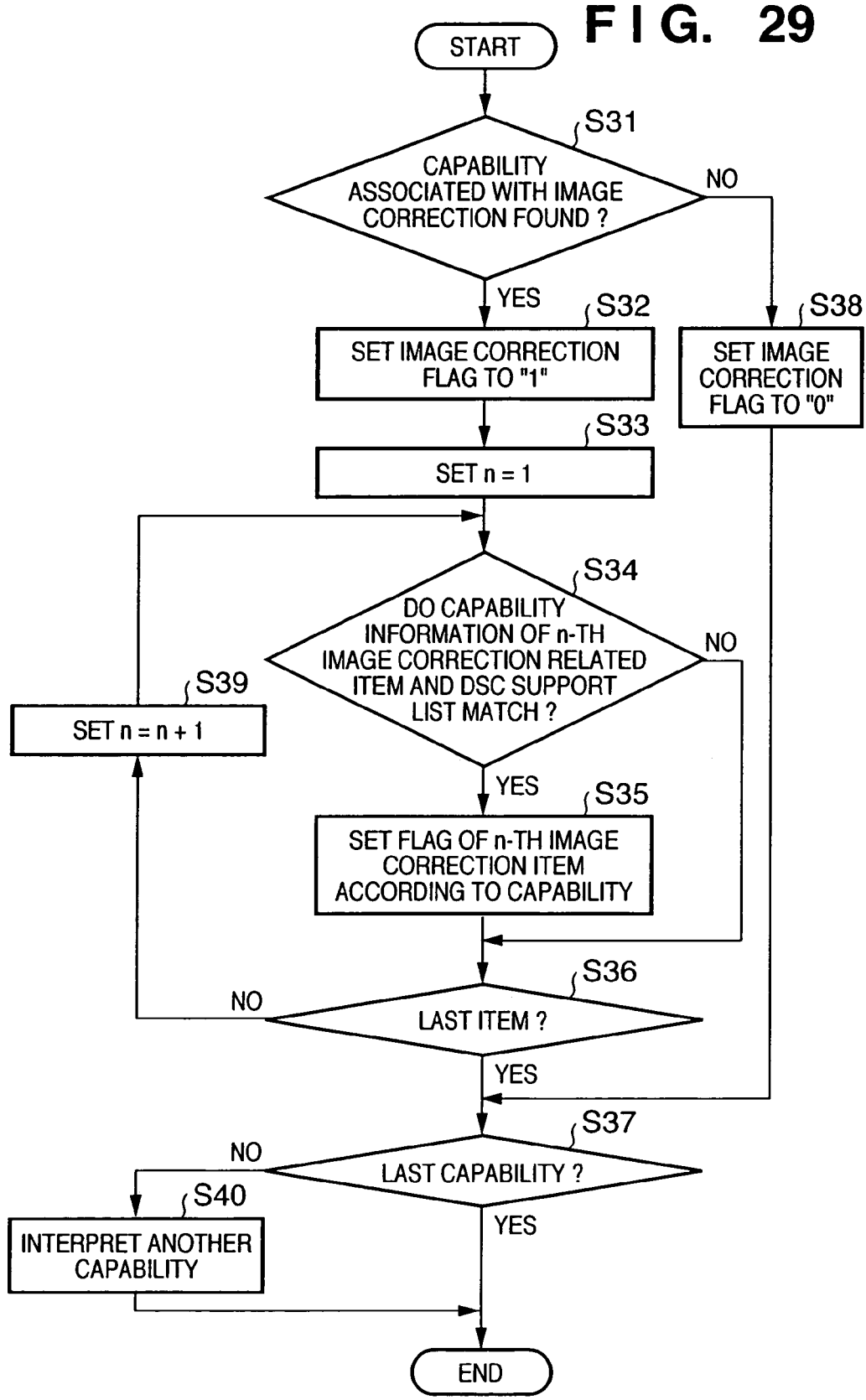
FIG. 29 is a flow chart showing the processing sequence of the digital camera according to the embodiment of the present invention.

Details of the Capability interpretation process in step S22 in FIG. 26 will be explained below using FIG. 29. Upon reception of Capability information associated with image correction from the PD printer 1000, this DSC 3012 executes the subsequent operation to attain some processes/operations for image correction. Note that this process is executed when the DSC 3012 supports Capability of image correction.

It is checked in step S31 if Capability information from the PD printer 1000 includes Capability information associated with image correction. If such Capability information is found, the flow advances to step S32 to set an image correction FLAG indicating the presence of an image correction item to be "1". When this image correction FLAG is "1", the DSC recognizes that Capability information associated with image correction is available, displays, on its display unit, a message indicating that the currently connected PD printer 1000 has a correction function, and uses that information in preparation upon generating a Capability list to be returned to the PD printer.

In step S33 and subsequent steps, checking processes of respective Capability information items associated with image correction are executed in turn. It is checked in step S34 if the DSC itself supports an item of interest as its function. If it is determined that the DSC supports that item, the flow advances to step S35 to set the contents of the corresponding item on the basis of the received Capability information. On the other hand, if it is determined in step S34 that the DSC does not support the item of interest, the DSC ignores that Capability item, and the flow jumps to step S36. It is then checked if the item of interest is a last one in the received image correction list (step S36). If the item of interest is not a last one, the next item is selected (step S39) to repeat steps S34 to S36.

If the item of interest is a last one associated with correction, the flow advances to step S37. If it is determined that the item of interest is also the last Capability item of all the Capability items from the printer, the flow ends; otherwise, the flow advances to the interpretation step (step S40) of the next Capability item, thus ending this flow. If it is determined in step S31 that no Capability item associated with image correction is found, the flow advances to step S38 to set the image correction FLAG to be "0" (not available). After that, the flow advances to step S37 to execute the above checking process, thus ending this flow.

Figure 26:
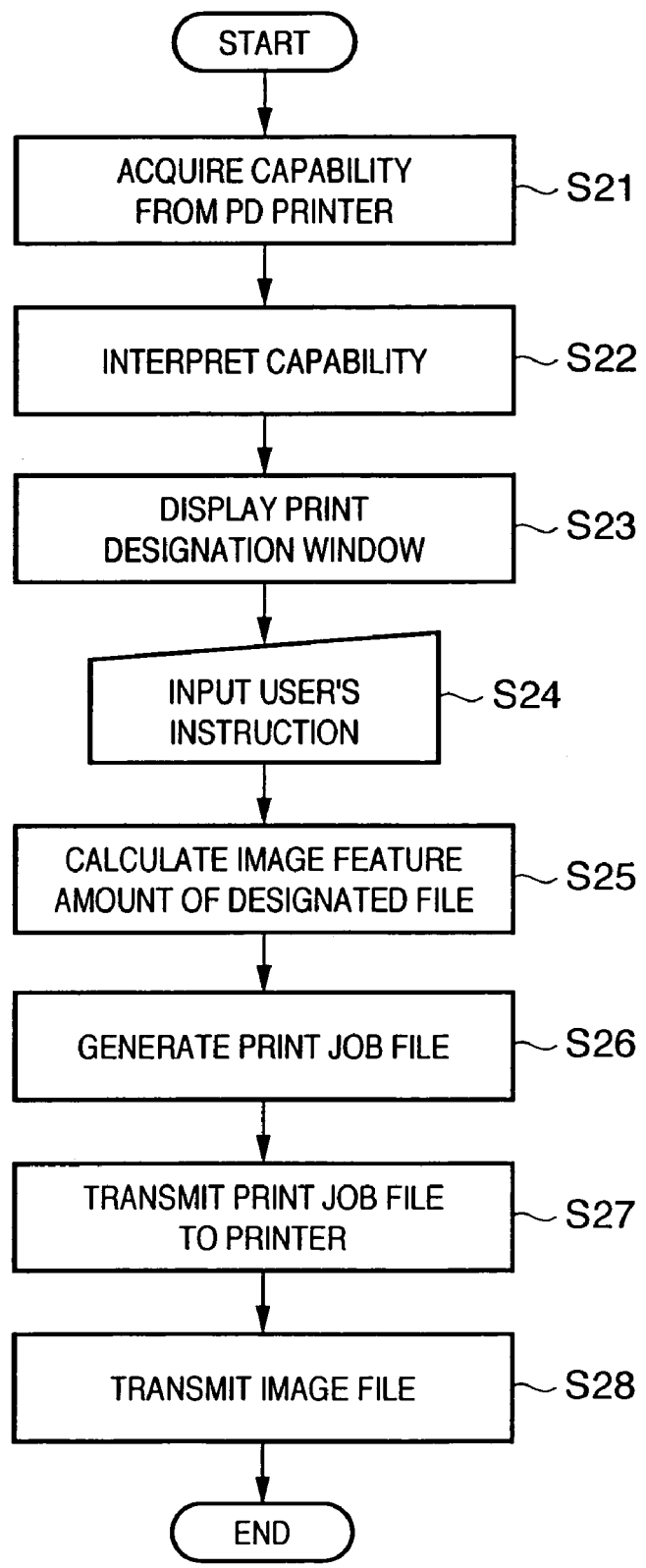
FIG. 26 is a flow chart for explaining a print instruction in "recommended procedure" in the DSC according to the embodiment of the present invention.

In the Capability interpretation process in step S22 in FIG. 26, various Capability items other than those of image correction are interpreted in practice. However, for the sake of easy understanding of the scope of the present invention, the above description has been given in association with only Capability items associated with image correction. The order/timing in relation to interpretation of other Capability items need not be particularly specified, and this process need only be done until formation of the UI/generation of a job designation file.

FIG. 27 shows an example of a print job file which is transmitted from the DSC 3012 to the PD printer 1000 at timing 2505 in FIG. 25. In this example, this print job file designates a print process of one file (file name "0001") saved in the DSC. Furthermore, the above information associated with image correction is designated by a description <ImageOptimize>81FF0108</ImageOptimize>. Also, the image file "0001" to be printed is described by <fileID>0001</fileID>, and a file H0001 that saves corresponding image feature amounts is described by <fileID>H0001</fileID>. Hence, the PD printer can request the DSC 3012 to send files of an image to be printed and its image feature amounts in accordance with this description.

When an image reproduction device such as the DSC 3012 or the like designates a print process of a desired image, this print job file automatically records information that designates a file that describes a file which describes the feature amounts of that image.

That is, when the reproduction device such as the DSC or the like has a function of extracting image feature amounts, if it recognizes that a print process of a given image is designated, the device automatically analyzes that image to extract feature amounts, and converts the feature amount data into a file. The print job file to be generated describes information which designates the file indicating the generated image feature amounts together with information which designates the image to be printed.

Upon selection of image data to be printed, if a file that describes image feature amounts corresponding to that image has already been generated and stored, an extraction process of new feature amounts of that image is skipped, and information which designates the file that describes the feature amounts of the image is automatically recorded in the job file.

In the above description, the method of storing the calculation result of the image feature amounts of the image to be printed in an independent file, and writing its file name in the print job file to be transmitted has been explained. When an image file itself to be transferred has an Exif format, information itself of image feature amounts of these histograms can be written in Exif private tags, thus omitting the file "H0001" that saves image feature amounts and the description <fileID>H0001</fileID> written in the print job file. As a result, the number of files to be referred to from the printer can be reduced, and the printer need not determine correspondence between the image file and the file that saves the image feature amounts. Hence, when a plurality of images are to be printed at the same time, the load on the control can be reduced, and the processing speed can be increased.

In the above description, the method of storing the calculation result of the image feature amounts of the image to be printed in an independent file, and writing its file name in the print job file to be transmitted has been explained. However, information itself of such histograms may be written in the above print job file.

FIG. 28 shows the contents of a print job file in this case. This print job file has substantially the same contents as those of the file shown in FIG. 27 which designates the file indicating the image feature amounts, except for the contents:

<histogramInfo>
    <histogramData>
    0100000050806 . . . 00
    </histogramData>
    </histogramInfo>

This numeral string part describes information of the image feature amount (a histogram associated with lightness) in the current transmission contents.

0100000050806 . . . 00

This data makes sense as hexadecimal values for respective bytes in a predetermined format. The first 1-byte data represents the "type of image feature amounts used in image correction" in Capability items associated with image correction. Since this byte is "01", it indicates that this data is a "histogram associated with lightness". The lightness frequencies of actual histogram data follow this data. In case of the lightness histogram, if the lightness range is 0 to 255, the number of frequency data of the histogram data is 256, and each histogram data is expressed by 1 byte. Hence, the total histogram data length including the first one byte indicating the type of feature amount is 257 bytes. Although the maximum value of frequency data is 255, this value does not mean the actual number of pixels, and indicates a value (ratio) normalized by the number of pixels of the entire image. In this way, even when the total number of pixels of the current image increases, the transmission data size can be prevented from being increased unwantedly.

FIG. 28 shows an example of only one type of image feature amount (histogram associated with lightness). However, in practice, a plurality of types of image feature amounts are to be transmitted. In such case, data are described by designating the types of histogram by each first one byte like:

<histogramInfo>
    <histogramData>
    0100000050806 . . . 00
    </histogramData>
    <histogramData>
    02000509589F5 . . . 00
    </histogramData>
    </histogramInfo>

This data description also allows easy interpretation on the printer side.

Upon making correction associated with, e.g., lightness, the PD printer 1000 of this embodiment receives the histogram associated with lightness from the DSC 3012, and corrects an image to be printed.

Figure 32:
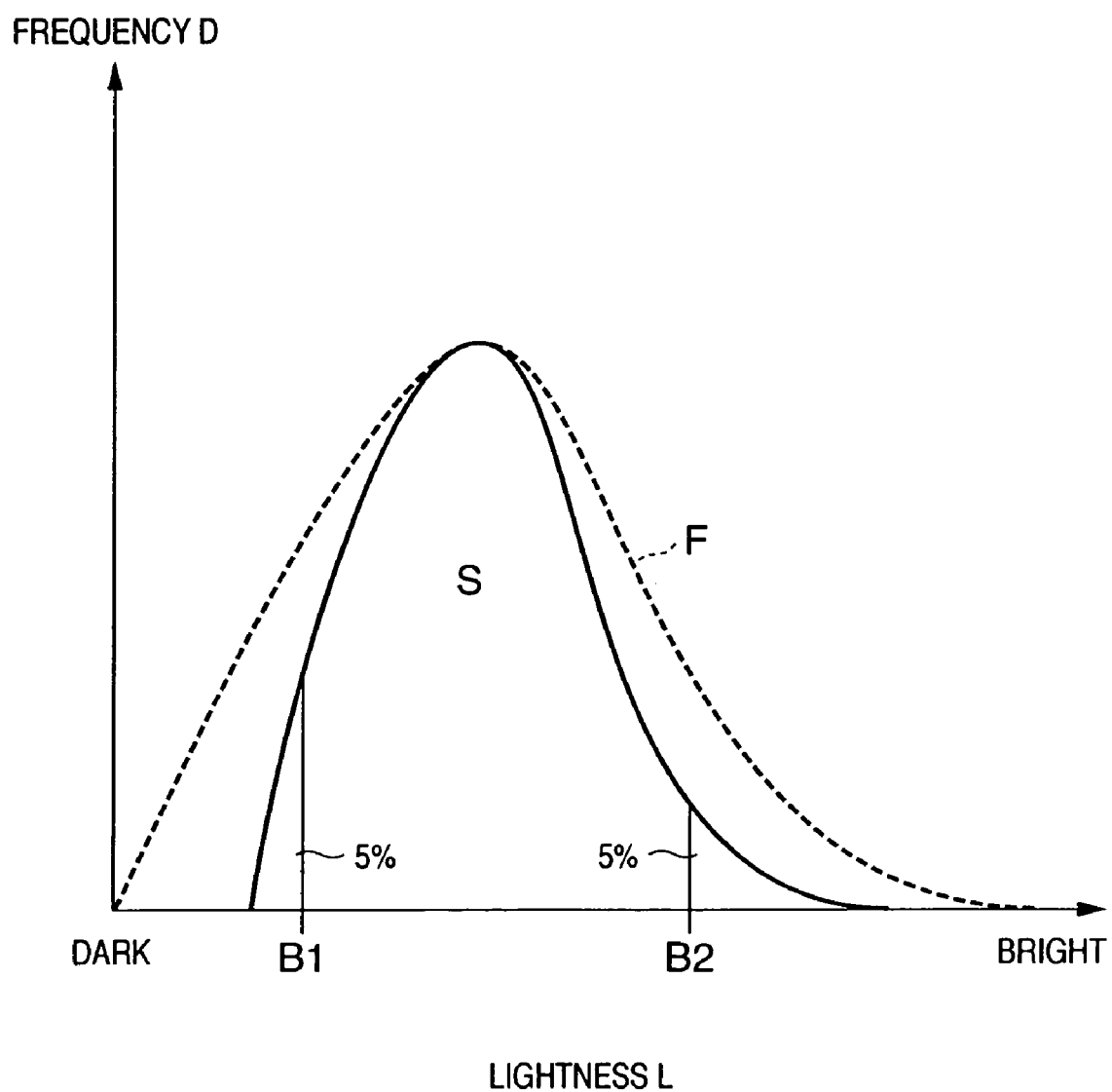
FIG. 32 is a graph showing the relationship between a lightness histogram and correction curve in the embodiment of the present invention.

An example of image correction will be described below with reference to FIG. 32. FIG. 32 shows a lightness histogram of a given image, and a case of a so-called out-of-focus image which has a narrow dynamic range associated with lightness of the entire image and has low contrast. The abscissa plots lightness L, and the ordinate plots frequency D.

Let D(L) be frequency data. Then, an area S of the histogram can be calculated by $\Sigma D(L)$. In this embodiment, a lightness value B1 corresponding to 5% of the area S from the lowest lightness position, and a lightness value B2 corresponding to 5% of the area S from the highest lightness position are calculated. Then, lightness correction curve F is determined based on the calculated lightness values B1 and B2 to make correction that broadens the dynamic range of the input image and increases its contrast. The lightness correction curve F may be prepared in advance as an LUT (lookup table) so as to be uniquely determined according to B1 and B2, or may be expressed by one function using B1, B2, and luminance values of input pixels as arguments.

In the above description, after the DSC 3012 receives function information (Capability information) of the PD printer, when the user designates an image to be printed, the DSC 3012 executes a feature amount extraction process. Such process is suited to calculate the feature amounts of only a designated image to be printed, and the total calculation load can be reduced compared to a case wherein the feature amounts of all images are to be extracted upon image sensing.

However, the feature amounts of respective images may be extracted upon image sensing, and may be stored in association with sensed images. In this case, the information associated with the extracted feature amounts may be recorded on a recording medium such as a memory card or the like together with image data. Upon generation of a print job file, feature amount data may be selectively transmitted to the printer in accordance with the function information.

With this arrangement, the calculation load upon image sensing is heavy, and feature amounts suited to function information may not always be extracted. However, in an image sensing apparatus that records many features associated with images as property information, the efficiency can be improved by using the already recorded information associated with feature amounts.

The effects of the present invention will be explained below. In image correction according to this embodiment, the DSC 3012 side calculates, in advance, image feature amounts required for image correction, and transmits them to the PD printer 1000. As a result, even when the data size of image data increases, an image file need not be transmitted from the DSC 3012 to the PD printer 1000 again and again needlessly. Hence, the system arrangement can be prevented from being complicated due to management/control of data transfer, and an increase in transfer time can be prevented, thus allowing a user-friendly direct print process. For example, even when the PD printer 1000 and DSC 3012 do not have full compatibility in association with the contents of image correction, an image transmitted from the DSC 3012 can be printed under the optimal print condition at that time.

Furthermore, the image analysis process required to obtain the image feature amounts imposes a heavier load on the CPU with increasing number of pixels to attain higher image quality, and adversely influences the print speed when such process is done in a limited environment of the printing apparatus. However, as described in this embodiment, since the DSC 3012 executes image analysis to calculate image feature amounts, the time required for image output can be shortened as a whole.

Note that the types of image feature amounts are not limited to those described in the above embodiment, and various other types of image feature amounts may be used.

Also, a plurality of feature amounts can be applied to one image. In such case, a plurality of feature amounts are converted into independent files, and a job file can describe these feature files. In addition, a plurality of feature amounts may be stored in one file together. In this case, the print job file can be easily described, and a communication between the printer and camera is simplified, thus shortening the required communication time.

At this time, a combination of the types of feature amounts to be applied to image data can be determined in accordance with the aforementioned Capability information. That is, feature amounts to be used are determined in accordance with the interpretation result of the Capability information.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions (processes executed on the camera side, and various print processes executed on the printer side) of the above-mentioned embodiment to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code. As the storage medium for storing the program code, for example, a floppy disk, hard disk, ROM, RAM, magnetic tape, nonvolatile memory card, optical disk (CD-ROM, CD-R, DVD), magneto-optical disk (MO), and the like may be used.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit. When the present invention is applied to the storage medium, that storage medium stores the program codes corresponding to the aforementioned flow charts.

As described above, according to the embodiment of the present invention, the PD printer is set as a USB host, the DSC is set as a slave, Capability information of the PD printer is transmitted to the DSC prior to a print operation, and the DSC can determine an optimal print mode based on that Capability information to designate a print process. Since this Capability information is transmitted in the script format, it can be easily exported to other communication protocols, thus allowing easy standardization.

Also, since a protocol between devices is implemented using a versatile file and versatile format, and a protocol layer of the application according to this embodiment is specified on its upper layer, the protocol which is independent from various interface specifications can be specified.

To restate, according to the embodiment of the present invention, print image data can be received and printed from image sensing apparatuses of various manufacturers by making image data transfer and a printing instruction, which do not depend on any interfaces.

Also, according to the embodiment of the present invention, since the image sensing apparatus calculates image feature amounts and transfers the calculation result to the printing apparatus, huge image data need not be transferred from the image sensing apparatus to the printing apparatus again and again, thus allowing a high-speed, user-friendly image output process.

Furthermore, according to the embodiment of the present invention, when a printing condition designated by the image sensing apparatus is different from an actual condition of the printing apparatus, an image is printed under the condition of the printing apparatus, thereby preventing deterioration of a printed image due to mismatch of the printing conditions.

As many apparently widely different embodiments of the present invention can be made without departing from the spirit and scope thereof, it is to be understood that the invention is not limited to the specific embodiments thereof except as defined in the claims.

What is claimed is:

1. A printing system in which an image sensing apparatus and a printing apparatus directly communicate with each other, and said printing apparatus prints an image transmitted from the image sensing apparatus,
    wherein said image sensing apparatus comprises:
        a first reception unit configured to receive function information of the printing apparatus from the printing apparatus, wherein the function information describes the kind of feature amount data which the printing apparatus can use in correction processing for the image to be printed;
        an extraction unit configured to analyze image data of an image file to be printed and extract from the image data a feature amount corresponding to the kind of feature amount data described in the function information received by said first reception unit;
        a generation unit configured to generate a data file which is a file independent from the image file and describes the feature amount extracted by said extraction unit, where the kind of the feature amount is determined in accordance with the function information received by said first reception unit; and
        a first transmission unit configured to transmit files of the data file generated by said generation unit and the image file to said printing apparatus;
    said printing apparatus comprises:
        a second transmission unit configured to transmit the function information of said printing apparatus from said printing apparatus to said image sensing apparatus;
        a second reception unit configured to receive the files of the data file and the image file transmitted by said first transmission unit;
        a correction unit configured to correct the image data of the image file received by said second reception unit on the basis of the received data file; and
        a printing unit configured to print the image in accordance with the image data corrected by said correction unit,
    wherein the data file is transmitted from said image sensing apparatus to said printing apparatus before the image file is transmitted from said image sensing apparatus to said printing apparatus.

2. The system according to claim 1, wherein said image sensing apparatus further comprises a designation unit configured to designate an image to be transmitted to said printing apparatus,
    wherein said extraction unit extracts the feature amount from the image designated by said designation unit.

3. The system according to claim 1, wherein said extraction unit generates a histogram of brightness, saturation, or hue as the feature amount.

4. The system according to claim 1, wherein said printing apparatus determines a parameter for correction in accordance with the data file and corrects the received image using the determined parameter.

5. The printing system according to claim 1, wherein said printing apparatus further comprises:
    a second extraction unit configured to analyze the image data of the image file received by said second reception unit and extract a second feature amount of the image data; and
    a second correcting unit configured to correct the image data of the image file received by said second reception unit using at least one of the feature amount described in the data file received from said image sensing apparatus by said second reception unit and the second feature amount extracted by said second extraction unit.

6. The printing system according to claim 1, wherein said image sensing apparatus further comprising a recording unit configured to record, as the data file, information related to the feature amount extracted by said extraction unit into a storage medium which is used for storing image files.

7. The printing system according to claim 6, wherein said image sensing apparatus further comprises a job transmission unit configured to transmit a print job designating the image to be printed to said printing apparatus,
    wherein the print job describes information of the image file to be printed and information related to the feature amount stored as the data file in the storage medium.

8. The printing system according to claim 7, wherein the print job describes information for specifying the image file to be printed and information for specifying the data file.

9. The printing system according to claim 1,
    wherein the function information describes a kind of histogram data which the printing apparatus can use in the correction processing for an the image to be printed,
    wherein the extraction unit extracts from the image data of the image file to be printed the histogram data corresponding to the kind of histogram data described in the function information received from the printing apparatus, and
    wherein the generation unit generates a feature amount data file describing the extracted histogram data.

10. An image sensing apparatus which can communicate with a printing apparatus, said image sensing apparatus comprising:
    a reception unit configured to receive function information of the printing apparatus from the printing apparatus, wherein the function information describes the kind of feature amount data which the printing apparatus can use in correction processing for an image to be printed;
    an extraction unit configured to analyze image data of an image file to be printed and extract from the image data a feature amount corresponding to the kind of feature amount data described in the function information received by said reception unit;
    a generation unit configured to generate a data file which is a file independent from the image file and describes the feature amount extracted by said extraction unit, where the kind of the feature amount is determined in accordance with the function information received by said reception unit; and
    a transmission unit configured to transmit files of the data file and the image file to said printing apparatus, wherein the data file is transmitted from said image sensing apparatus to said printing apparatus before the image file is transmitted from said image sensing apparatus to said printing apparatus.

11. The image sensing apparatus according to claim 10, further comprising a designation unit configured to designate the image to be transmitted to said printing apparatus,
wherein said transmission unit transmits the data file to said printing apparatus before the image designated by said designation unit is transmitted to said printing apparatus.

12. The image sensing apparatus according to claim 10, further comprising a designation unit configured to designate an image to be transmitted to said printing apparatus,
wherein said extraction unit extracts the feature amount from the image designated by said designation unit.

13. The image sensing apparatus according to claim 10, wherein said extraction unit generates a histogram of brightness, saturation, or hue as the feature amount.

14. The image sensing apparatus according to claim 10, wherein said image sensing apparatus further comprises a recording unit configured to record, as the data file, information related to the feature amount extracted by said extraction unit into a storage medium which is used for storing image files.

15. The image sensing apparatus according to claim 14, wherein said image sensing apparatus further comprises a job transmission unit configured to transmit a print job designating the image to be printed to said printing apparatus,
wherein the print job describes information of the image file to be printed and information related to the feature amount stored as a data file in the storage medium.

16. The image sensing apparatus according to claim 15, wherein the print job describes information for specifying the image file to be printed and information for specifying the data file.

17. The image sensing apparatus according to claim 10,
wherein the function information describes a kind of histogram data which the printing apparatus can use in the correction processing for the image to be printed,
wherein the extraction unit extracts from the image data of the image file to be printed the histogram data corresponding to the kind of histogram data described in the function information received from the printing apparatus, and
wherein the generation unit generates a feature amount data file describing the extracted histogram data.

18. A method of controlling an image sensing apparatus and a printing apparatus which directly communicate with each other, and said printing apparatus prints an image transmitted from the image sensing apparatus, comprising:
a first reception step of receiving, by the image sensing apparatus, function information of the printing apparatus from the printing apparatus, wherein the function information describes the kind of feature amount data which the printing apparatus can use in correction processing for an image to be printed;
an extraction step of analyzing image data of an image file to be printed and extracting from the image data a feature amount corresponding to the kind of feature amount data described in the function information received by said first reception step;
a generation step of generating a data file which is a file independent from the image file and describes the feature amount extracted by said extraction step, where the kind of the feature amount is determined in accordance with the function information received by said first reception step; and
a first transmission step of transmitting files of the data file generated by said generation step and the image file to said printing apparatus;
a second transmission step of transmitting the function information of said printing apparatus from said printing apparatus to said image sensing apparatus;
a second reception step of receiving the files of the data file and the image data of the image file transmitted by said first transmission step;
a correction step of correcting the image data of the image file received by said second reception step on the basis of the received data file; and
a printing step of printing the image in accordance with the image data corrected by said correction step,
wherein the data file is transmitted from said image sensing apparatus to said printing apparatus before the image file is transmitted from said image sensing apparatus to said printing apparatus.

19. The method according to claim 18, further comprising a designation step of designating the image to be transmitted to said printing apparatus,
wherein said extraction step extracts the feature amount from the image designated by said designation step.

20. The method according to claim 18, wherein said extraction step generates a histogram of brightness, saturation, or hue as the feature amount.

21. The method according to claim 18, wherein the correction step determines a parameter in accordance with the data file and corrects the received image data using the determined parameter.

22. The method according to claim 18, further comprising:
a second extraction step of analyzing the image data of the image file received by said second reception step and extracting a second feature amount of the image data; and
a second correcting step of correcting the image data of the image file received by said second reception step using at least one of the feature amount described in the data file received by said second reception step and the second feature amount extracted by said second extraction step.

23. The method according to claim 18, further comprising a recording step of recording, as the data file, information related to the feature amount extracted by said extraction step into a storage medium which is used for storing image files.

24. The method according to claim 18, further comprising a job transmission step of transmitting a print job designating the image to be printed to said printing apparatus,
wherein the print job describes information of the image file to be printed and information related to the feature amount stored as the data file in the storage medium.

25. The method according to claim 24, wherein the print job describes information for specifying the image file to be printed and information for specifying the data file.

26. The method according to claim 18,
wherein the function information describes a kind of histogram data which the printing apparatus can use in the correction processing for the image to be printed,
wherein the extraction step extracts from the image data of the image file to be printed the histogram data corresponding to the kind of histogram data described in the function information received from the printing apparatus, and wherein the generation step generates a feature amount data file describing the extracted histogram data.

27. A method whereby an image sensing apparatus communicates with a printing apparatus, comprising:
- a reception step of receiving, by the image sensing apparatus, function information of the printing apparatus from the printing apparatus, wherein the function information describes the kind of feature amount data which the printing apparatus can use in correction processing for an image to be printed;
- an extraction step of analyzing image data of an image file to be printed and extracting from the image data a feature amount corresponding to the kind of feature amount data described in the function information received by said reception step;
- a generation step of generating a data file which is a file independent from the image file and describes the feature amount extracted by said extraction step, where the kind of the feature amount is determined in accordance with function information received by said reception step; and
- a transmission step of transmitting files of the data file and the image file to said printing apparatus,
- wherein the data file is transmitted from said image sensing apparatus to said printing apparatus before the image file is transmitted from said image sensing apparatus to said printing apparatus.

28. The method according to claim 27, further comprising a designation step of designating the image to be transmitted to said printing apparatus,
   wherein said transmission step transmits the data file to said printing apparatus before the image designated by said designation step is transmitted to said printing apparatus.

29. The method according to claim 27, further comprising a designation step of designating the image to be transmitted to said printing apparatus,
   wherein said extraction step extracts the feature amount from the image designated by said designation step.

30. The method according to claim 27, wherein said extraction step generates a histogram of brightness, saturation, or hue as the feature amount.

31. The method according to claim 27, further comprises a recording step of recording, as the data file, information related to the feature amount extracted by said extraction step into a storage medium which is used for storing image files.

32. The method according to claim 31, further comprising a job transmission step of transmitting a print job designating the image to be printed to said printing apparatus,
   wherein the print job describes information of the image file to be printed and information related to the feature amount stored as the data file in the storage medium.

33. The method according to claim 32, wherein the print job describes information for specifying the image file to be printed and information for specifying the data file.

34. The method according to claim 27,
   wherein the function information describes a kind of histogram data which the printing apparatus can use in the correction processing for the image to be printed,
   wherein the extraction step extracts from the image data of the image file to be printed the histogram data corresponding to the kind of histogram data described in the function information received from the printing apparatus, and
   wherein the generation step generates a feature amount data file describing the extracted histogram data.

35. A computer-readable medium encoded with a computer program communicating with a printing apparatus, for implementing a method, comprising:
- a reception step of receiving, by an image sensing apparatus, function information of the printing apparatus from the printing apparatus, wherein the function information describes the kind of feature amount data which the printing apparatus can use in correction processing for an image to be printed;
- an extraction step of analyzing image data of an image file to be printed and extract from the image data a feature amount corresponding to the kind of feature amount data described in the function information received by said reception step;
- a generation step of generating a data file which is a file independent from the image file and describes the feature amount extracted by said extraction step, where the kind of the feature amount is determined in accordance with the function information received by said reception step; and
- a transmission step of transmitting files of the data file and the image file to said printing apparatus,
- wherein the data file is transmitted from said image sensing apparatus to said printing apparatus before the image file is transmitted from said image sensing apparatus to said printing apparatus.

36. The computer-readable medium according to claim 35, the implemented method further comprises a recording step of recording, as the data file, information related to the feature amount extracted by said extraction step into a storage medium which is used for storing image files.

37. The computer-readable medium according to claim 36, wherein said implemented method further comprises a job transmission step transmitting a print job designating the image to be printed to said printing apparatus,
   wherein the print job describes information of the image file to be printed and information related to the feature amount stored as the data file in the storage medium.

38. The computer-readable medium according to claim 37, wherein the print job describes information for specifying the image file to be printed and information for specifying the data file.

39. The computer-readable medium according to claim 35,
   wherein the function information describes a kind of histogram data which the printing apparatus can use in the correction processing for the image to be printed,
   wherein the extraction step extracts from the image data of the image file to be printed the histogram data corresponding to the kind of histogram data described in the function information received from the printing apparatus, and
   wherein the generation step generates the feature amount data file describing the extracted histogram data.

* * * * *